US012787990B2

(12) United States Patent
Kerolos

(10) Patent No.: US 12,787,990 B2
(45) Date of Patent: Nov. 10, 2026

(54) FISH CATCHING TRAP

(71) Applicant: Maged Kerolos, Camarillo, CA (US)

(72) Inventor: Maged Kerolos, Camarillo, CA (US)

( * ) Notice: Subject to any disclaimer, the term of this patent is extended or adjusted under 35 U.S.C. 154(b) by 104 days.

(21) Appl. No.: 18/530,014

(22) Filed: Dec. 5, 2023

(65) Prior Publication Data

US 2025/0176513 A1 Jun. 5, 2025

(51) Int. Cl.
*A01K 69/06* (2006.01)

(52) U.S. Cl.
CPC .................................... *A01K 69/06* (2013.01)

(58) Field of Classification Search
CPC ........ A01K 69/00; A01K 69/06; A01K 69/08; A01K 69/10
USPC .................................. 43/100, 102, 103, 105
See application file for complete search history.

(56) References Cited

U.S. PATENT DOCUMENTS 85,199 A * 12/1868 Beach ................... A01M 23/36 43/79
113,292 A * 4/1871 Hammond ............. A01K 69/06 43/15
132,476 A * 10/1872 Livaudais .............. A01K 69/06 43/16
237,231 A * 2/1881 Atkinson ............... A01K 69/06 43/105
424,548 A * 4/1890 Franklin ................ A01K 69/06 43/105
708,380 A * 9/1902 Merle .................... A01K 69/06 43/105
756,438 A * 4/1904 Uhlenhart .............. A01K 85/00 362/477
937,360 A * 10/1909 Cole ..................... A01M 23/36 43/79
1,143,758 A * 6/1915 Franklin ................ A01K 69/06 43/105
1,161,186 A * 11/1915 Butcher ................. A01K 69/06 43/105

(Continued)

FOREIGN PATENT DOCUMENTS

CN 201781862 U * 4/2011
CN 102613144 A * 8/2012

(Continued)

OTHER PUBLICATIONS

Translation of SU 1346090 A1 (Year: 1987).*

*Primary Examiner* — Darren W Ark
(74) *Attorney, Agent, or Firm* — LYON & HARR, LLP; Richard T. Lyon

(57) ABSTRACT

A fish catching trap that includes two dome-shaped plates that are oriented so that their interior surfaces face each other, and planes defined by their rims are substantially parallel to each other. In one version, the plates are attached to opposite ends of a centrally-located telescopic rod. In a set position, the plates are vertically separated, and the telescopic rod is locked in that position. The fish catching trap is then triggered, which causes the plates to come together to a degree of closure and at a speed that traps a fish that has swum between the plates before it can swim out. The fish catching trap can be triggered manually by a user or automatically when a fish is detected between the plates. In addition, in some versions the fish catching trap can be triggered by remote control.

18 Claims, 25 Drawing Sheets

(56) References Cited

U.S. PATENT DOCUMENTS

| | | | | | |
|---|---|---|---|---|---|
| 1,876,692 | A * | 9/1932 | Kornsweet | A01K 69/06 | 43/17.5 |
| 2,196,928 | A * | 4/1940 | Lile | A01K 69/08 | 43/100 |
| 2,473,910 | A * | 6/1949 | Ruiz | A01K 69/06 | 43/105 |
| 2,489,856 | A * | 11/1949 | Buford | A01M 23/16 | 43/102 |
| 2,582,015 | A * | 1/1952 | Duncan, Jr. | A01K 75/00 | 43/4.5 |
| 2,586,350 | A * | 2/1952 | Lamb | A01K 69/06 | 43/61 |
| 2,603,031 | A * | 7/1952 | Haseman | A01K 69/06 | 43/105 |
| 2,639,540 | A * | 5/1953 | Buford | A01K 69/06 | 43/102 |
| 2,656,642 | A * | 10/1953 | Richa | A01K 69/06 | 43/88 |
| 2,679,125 | A * | 5/1954 | Howard | A01K 69/06 | 43/62 |
| 2,741,063 | A * | 4/1956 | Mccallum | A01K 69/08 | 43/66 |
| 2,787,861 | A * | 4/1957 | Hansen | A01K 69/06 | 43/102 |
| 2,898,698 | A * | 8/1959 | Bair | A01K 85/01 | 43/17.5 |
| 2,908,993 | A * | 10/1959 | Webb | A01K 69/08 | 43/44.99 |
| 3,203,134 | A * | 8/1965 | Ames | A01K 97/05 | D22/136 |
| 3,314,187 | A * | 4/1967 | Marcinkowski | A01K 69/10 | 43/105 |
| 3,337,982 | A * | 8/1967 | Sajulan | A01K 69/08 | 43/65 |
| 3,380,187 | A * | 4/1968 | Werstlein | A01K 69/06 | 43/100 |
| 3,484,981 | A * | 12/1969 | Gilmer | A01K 73/12 | 43/105 |
| 3,494,064 | A * | 2/1970 | Stein | A01K 79/00 | 43/17.1 |
| 3,508,358 | A * | 4/1970 | Lee | A01M 23/20 | 43/60 |
| 3,553,881 | A * | 1/1971 | Hasseman | A01K 69/06 | 43/105 |
| 3,638,346 | A * | 2/1972 | Stein | A01K 79/02 | 43/17.1 |
| 3,748,776 | A * | 7/1973 | Mueller | A01K 69/06 | 43/103 |
| 3,815,279 | A * | 6/1974 | Poirot | A01K 69/00 | 43/17 |
| 3,903,637 | A * | 9/1975 | Dorsey | A01K 69/10 | 43/105 |
| 3,905,143 | A * | 9/1975 | Poirot | A01K 69/00 | 43/14 |
| 3,908,301 | A * | 9/1975 | Ortiz | A01K 69/06 | 43/105 |
| 3,939,597 | A * | 2/1976 | McSherry | A01K 69/06 | 43/105 |
| 4,134,225 | A * | 1/1979 | Welch | A01K 69/10 | 383/14 |
| 4,147,130 | A * | 4/1979 | Goguel | A01K 61/60 | 119/223 |
| 4,156,984 | A * | 6/1979 | Kinser, Sr. | A01K 69/10 | 43/105 |
| 4,237,645 | A * | 12/1980 | Kinser | A01K 69/06 | 43/105 |
| 4,237,646 | A * | 12/1980 | Mims, III | A01K 69/10 | 43/103 |
| 4,262,379 | A * | 4/1981 | Jankiewicz | A01K 69/08 | 441/2 |
| 4,373,286 | A * | 2/1983 | Robison | A01K 69/00 | 43/10 |
| 4,434,575 | A * | 3/1984 | Pearson | A01K 69/06 | 43/17.1 |
| 4,445,295 | A * | 5/1984 | Litrico | A01K 69/06 | 43/100 |
| 4,447,978 | A * | 5/1984 | Robison | A01K 69/00 | 43/10 |
| 4,587,758 | A * | 5/1986 | Ponzo | A01K 69/06 | 43/100 |
| 4,594,804 | A * | 6/1986 | Misko | A01K 69/06 | 43/105 |
| 4,697,374 | A * | 10/1987 | Simms | A01K 97/00 | 43/17.1 |
| 4,765,089 | A * | 8/1988 | Rowe | A01K 69/06 | 43/105 |
| 4,821,451 | A * | 4/1989 | Matson | A01K 69/06 | 43/105 |
| 4,831,774 | A * | 5/1989 | Gonzalez | A01K 69/06 | 43/100 |
| 4,858,372 | A * | 8/1989 | Ray | A01K 97/20 | 43/17.5 |
| 5,133,149 | A * | 7/1992 | Smyly, Sr. | A01K 69/06 | 43/17 |
| 5,174,059 | A * | 12/1992 | Durbin | A01K 69/06 | 43/44.99 |
| 5,259,809 | A * | 11/1993 | Rainey, Jr. | A01K 69/06 | 119/213 |
| 5,343,442 | A * | 8/1994 | Vielberth | A01K 74/00 | 43/4.5 |
| 5,561,939 | A * | 10/1996 | Wik | A01K 69/06 | D22/199 |
| 5,651,209 | A * | 7/1997 | Rainey | A01K 97/00 | 43/44.99 |
| 6,261,142 | B1 * | 7/2001 | Fiotakis | B63B 22/02 | 441/2 |
| 7,503,141 | B1 * | 3/2009 | Leeman | A01K 97/02 | 43/44.99 |
| 7,534,152 | B1 * | 5/2009 | Lloyd | A01K 69/06 | 441/2 |
| 8,919,034 | B2 * | 12/2014 | Alhuwaishel | A01M 31/002 | 43/64 |
| 11,147,251 | B1 * | 10/2021 | Fu | B64U 10/70 | |
| 11,617,358 | B2 * | 4/2023 | Martin | A01K 81/06 | 43/6 |
| 11,712,028 | B2 * | 8/2023 | Bajer | A01K 73/05 | 43/100 |
| 2006/0288634 | A1 * | 12/2006 | Wimbus | A01K 69/10 | 43/100 |
| 2009/0025271 | A1 * | 1/2009 | Duckworth | A01K 97/02 | 43/44.99 |
| 2010/0293831 | A1 * | 11/2010 | Hreinsson | A01K 79/02 | 43/4.5 |
| 2015/0313199 | A1 * | 11/2015 | Castaneda | A01K 65/00 | 702/2 |
| 2015/0334999 | A1 * | 11/2015 | Blakey | A01K 85/01 | 43/4.5 |
| 2016/0000055 | A1 * | 1/2016 | Best | A01K 69/10 | 43/17.5 |
| 2016/0106079 | A1 * | 4/2016 | Best | A01K 97/05 | 43/102 |
| 2018/0206459 | A1 * | 7/2018 | Crawford | A01K 79/00 | |
| 2018/0303077 | A1 * | 10/2018 | Dauphinee | A01K 69/08 | |
| 2020/0253177 | A1 * | 8/2020 | Abedi | A01K 97/00 | |
| 2021/0244005 | A1 * | 8/2021 | Sinclair | A01G 33/00 | |
| 2023/0386716 | A1 * | 11/2023 | Bezanson | H01F 7/123 | |
| 2023/0397583 | A1 * | 12/2023 | Campbell | B63B 22/06 | |
| 2024/0133214 | A1 * | 4/2024 | Bezanson | E05B 47/023 | |

FOREIGN PATENT DOCUMENTS

| | | | | |
|---|---|---|---|---|
| CN | 103355262 | A * | 10/2013 | |
| CN | 103651275 | A * | 3/2014 | |
| CN | 104904680 | A * | 9/2015 | A01K 69/06 |
| CN | 105104315 | A * | 12/2015 | A01K 69/06 |
| CN | 205902672 | U * | 1/2017 | |
| CN | 205902673 | U * | 1/2017 | |
| CN | 206533952 | U * | 10/2017 | |

(56) References Cited

FOREIGN PATENT DOCUMENTS

| | | | | | |
|---|---|---|---|---|---|
| CN | 206547658 | U | * | 10/2017 | |
| CN | 206565121 | U | * | 10/2017 | |
| CN | 206576107 | U | * | 10/2017 | |
| CN | 108077198 | A | * | 5/2018 | A01K 69/00 |
| CN | 108682127 | A | * | 10/2018 | G08B 21/24 |
| CN | 208271367 | U | * | 12/2018 | |
| CN | 109221035 | A | * | 1/2019 | A01K 69/08 |
| CN | 208875155 | U | * | 5/2019 | |
| CN | 209017699 | U | * | 6/2019 | |
| CN | 209518128 | U | * | 10/2019 | |
| CN | 112352743 | A | * | 2/2021 | G01S 19/42 |
| CN | 213639363 | U | * | 7/2021 | |
| CN | 213819444 | U | * | 7/2021 | |
| CN | 113994934 | A | * | 2/2022 | A01K 69/06 |
| CN | 216567815 | U | * | 5/2022 | |
| CN | 115005168 | A | * | 9/2022 | A01K 69/06 |
| DE | 9112715 | U1 | * | 3/1992 | |
| ES | 2014768 | A6 | * | 7/1990 | |
| FR | 757013 | A | * | 12/1933 | |
| FR | 762264 | A | * | 4/1934 | |
| FR | 1331629 | A | * | 7/1963 | |
| KR | 20020023990 | A | * | 3/2002 | A01K 69/06 |
| KR | 100474813 | B1 | * | 3/2005 | A01K 95/00 |
| KR | 200453378 | Y1 | * | 4/2011 | A01K 69/10 |
| KR | 101174805 | B1 | * | 8/2012 | A01K 69/10 |
| KR | 200462007 | Y1 | * | 8/2012 | A01K 73/00 |
| KR | 101448808 | B1 | * | 10/2014 | B63B 35/44 |
| KR | 20210091436 | A | * | 7/2021 | B64C 39/024 |
| KR | 1020210091436 | A | | 7/2021 | |
| KR | 20220114124 | A | * | 8/2022 | G01K 13/00 |
| KR | 1020220114124 | A | | 8/2022 | |
| SU | 1346090 | A1 | * | 10/1987 | |
| SU | 1440447 | A1 | * | 11/1988 | |
| WO | WO-0143541 | A1 | * | 6/2001 | A01K 69/06 |
| WO | WO-2017042785 | A1 | * | 3/2017 | A01K 69/06 |
| WO | WO-2017042786 | A1 | * | 3/2017 | A01K 69/08 |
| WO | WO-2019138110 | A1 | * | 7/2019 | A01K 69/10 |
| WO | WO-2019145182 | A1 | * | 8/2019 | H04N 23/54 |
| WO | WO-2020150819 | A1 | * | 7/2020 | G01S 19/14 |
| WO | WO-2022153076 | A2 | * | 7/2022 | A01K 69/06 |
| WO | WO-2022165596 | A1 | * | 8/2022 | A01K 69/08 |

* cited by examiner

FISH CATCHING TRAP

BACKGROUND

Fish catching traps are devices used to catch fish and other aquatic animals. They include fishing weirs, cage traps, fish wheels, and fyke nets. In general, these existing traps are placed in the water and left there. The user returns at some point in time in the future to retrieve the trap and see if one or more fish have been caught. The user has no control on the type or number of fish that are caught, and other than setting the trap, has no active role in catching the fish.

SUMMARY

The fish catching trap implementations described herein generally includes two plates that are oriented to be substantially parallel to each other. In a set position, the plates are vertically separated. The fish catching trap is then triggered, which causes the plates to come together to a degree of closure and at a speed that traps a fish that has swum between the plates before it can swim out.

More particularly, in one implementation, the fish catching trap includes a first plate having a shape including an outward facing surface and an inward facing surface and an outer rim, as well as a second plate having substantially the same shape as the first plate with an outward facing surface and an inward facing surface and an outer rim. The inward facing surface of the second plate faces the inward facing surface of the first plate and a plane defined by the outer rim of the second plate is oriented substantially parallel to a plane defined by the outer rim of the first plate. A telescoping rod is also included. This telescoping rod is extendable to a set position and retractable to a closed position, and contracts longitudinally from the set position to the closed position unless locked into the set position. The first plate is attached to the first end of the telescoping rod at a centrally located area of the first plate and the second plate is attached to a second end of the telescoping rod at a centrally located area of the second plate. There is also a trigger mechanism which when engaged locks the telescoping rod in the set position wherein the first and second plates are spaced apart by a prescribed distance, and which when triggered releases the trigger mechanism causing the telescoping rod to contract to the closed position wherein the first and second plates are drawn together to a degree of closure and at a speed that traps a fish that has swum between the plates before it can swim out.

In an alternate implementation, the fish catching trap includes a first plate having a shape including an outward facing surface, an inward facing surface, an outer rim, and a centrally located ring. In addition, there is a second plate having substantially the same shape as the first plate with an outward facing surface, an inward facing surface, an outer rim, and a centrally located ring. The inward facing surface of the second plate faces the inward facing surface of the first plate, and a plane defined by the outer rim of the second plate is oriented substantially parallel to a plane defined by the outer rim of the first plate. There is also a hollow transparent cylinder on which the first and second plates are installed. The inner diameter of the rings of the first and second plates are sized to create a sliding fit with the external surface of the cylinder so that the first and second plates can slide toward and away from each other along the cylinder. A telescoping rod is included as well. The telescoping rod includes a middle section that is attached to the transparent cylinder and extendable distal sections at both end of the middle section that allow the telescoping rod to be extendable to a set position and retractable to a closed position. The ring of the first plate is attached to a first end of the telescoping rod and the ring of the second plate is attached to a second end of the telescoping rod at corresponding radial positions such that the middle section of the telescoping rod extends along the outside surface of the cylinder and has a longitudinal axis that is parallel to the longitudinal axis of the cylinder. One or more rigid guide rods are included each of which is attached to and extends along the outside of the cylinder. Each of the guide rods intersects the ring of each plate at corresponding radial positions and passes through a passage in each ring. The guide rod or rods are equally spaced radially from each other, and the telescoping rod and each guide rod is at least long enough to extend completely through each ring of the plates when the telescoping rod is extended to the set position. There is also a trigger mechanism which when engaged locks the telescoping rod in the set position where the first and second plates are spaced apart by a prescribed distance, and which when triggered releases the trigger mechanism causing the telescoping rod to contract to the closed position wherein the first and second plates are drawn together to a degree of closure and at a speed that traps a fish that has swum between the plates before it can swim out.

The foregoing Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the fish catching trap implementations described herein will become better understood with regard to the following description, appended claims, and accompanying drawings where:

FIG. 1A shows the fish catching trap in its open, set position, and FIG. 1B shows the trap its closed position.

FIG. 6A shows the telescoping rod in a fully extended position, FIG. 6B shows the rod in a partially retracted position, and FIG. 6C shows the rod in a fully retracted position.

FIG. 9A shows the fish catching trap in its open, set position, and FIG. 9B shows the trap its closed position.

DETAILED DESCRIPTION

In the following description of the fish catching trap implementations reference is made to the accompanying drawings which form a part hereof, and in which are shown, by way of illustration, specific implementations in which the fish catching trap can be practiced. It is understood that other implementations can be utilized, and structural changes can be made without departing from the scope of the fish catching trap.

It is also noted that for the sake of clarity specific terminology will be resorted to in describing the fish catching trap implementations and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation" means that a particular feature, a particular structure, or particular characteristics described in connection with the implementation or implementation can be included in at least one implementation of the fish catching trap. The appearances of the phrases "in one implementation", "in another implementation", "in an exemplary implementation", "in an alternate implementation", "in one implementation", "in another implementation", "in an exemplary implementation", and "in an alternate implementation" in various places in the specification are not necessarily all referring to the same implementation or implementation, nor are separate or alternative implementations/implementations mutually exclusive of other implementations/implementations. Yet furthermore, the order of process flow representing one or more implementations or implementations of the fish catching trap does not inherently indicate any particular order nor imply any limitations of the fish catching trap.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Fish Catching Trap

In general, the fish catching trap implementations described herein include two plates that are oriented to be substantially parallel to each other. In a set position, the plates are vertically separated. The fish catching trap is then triggered, which causes the plates to come together to a degree of closure and at a speed that traps a fish that has swum between the plates before it can swim out.

1.1 Centrally-Located Telescoping Rod Implementations

Figure 1A:
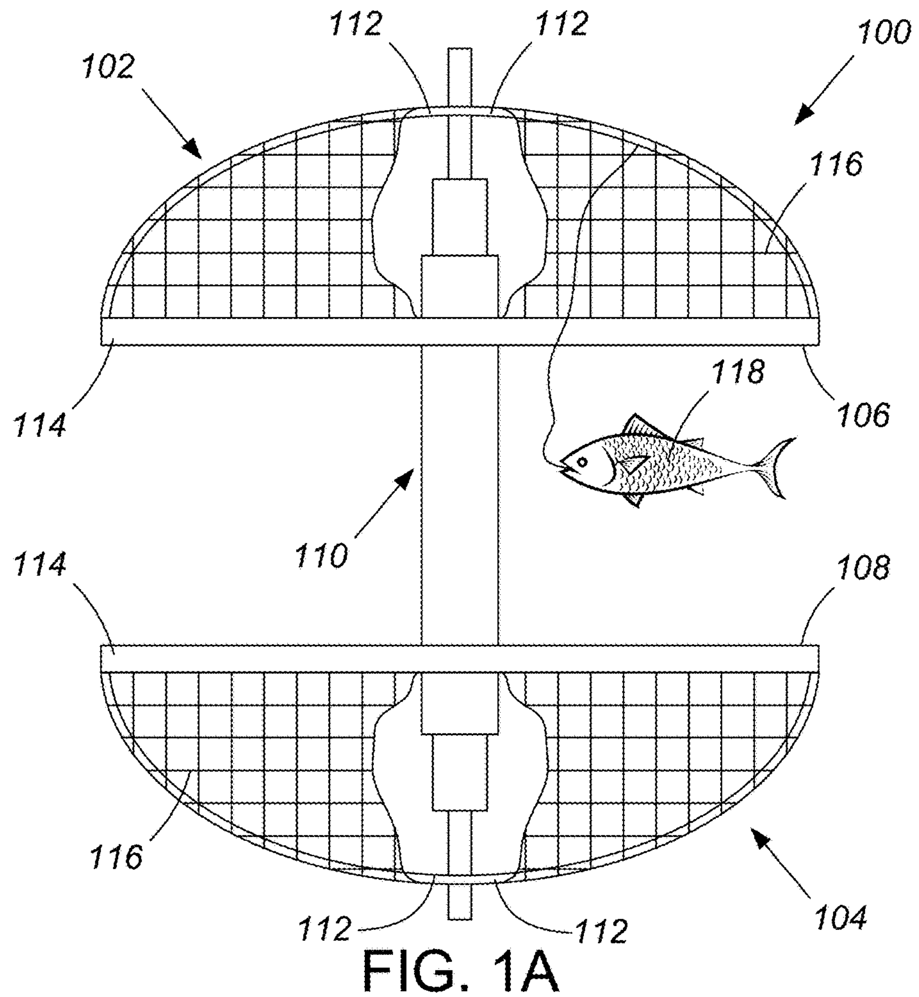
FIGS. 1A and 1B are illustrations of an exemplary implementation of a fish catching trap that includes a centrally-located telescopic rod with dome-shaped plates attached to each end of the rod.
Figure 1B:
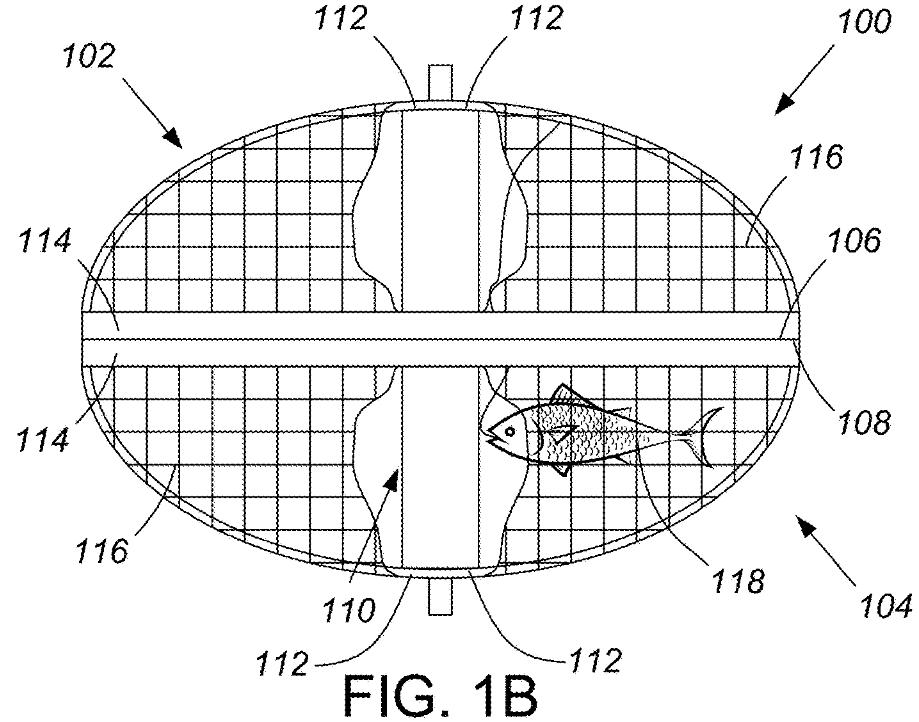

Referring to FIGS. 1A-B, in one implementation, the fish catching trap 100 includes two plates 102, 104 that are substantially parallel to each other. FIG. 1A shows the fish catching trap in the set position and FIG. 1B shows the trap in the closed position. In the depicted version, the plates 102, 104 are dome shaped with outer rims 106, 108 that are of substantially equal diameter. The plates are each connected to a centrally-located telescoping rod 110 that can be extended and locked into a maximum extended position (or set position) where the plates 102, 104 are spaced apart a prescribed distance. Once in the set position, the telescoping rod 110 can be triggered which then causes the rod to contract longitudinally thereby bringing the plates 102, 104 together into a closed position with a degree of closure and at a speed that traps a fish that has swum between the plates before it can swim out. The height of the dome formed by each plate 102, 104 at a centrally located area of the plate where the telescoping rod 110 is attached is approximately one-half the longitudinal length of the telescoping rod when in its closed position. This ensures an inward facing edge of the outer rim of the upper plate 102 touches an inward facing edge of the outer rim of the lower plate 104 whenever the telescoping rod 110 is in its closed position.

In one version, each of the plates 102, 104 has one or more (e.g., 3) spokes 112 that connect an annular hoop portion 114 of the plates to the rod 110. In addition, the top of the upper plate 102 is covered with a mesh material 116 (e.g., a fishing net material), as is the bottom of the lower plate 104. This material 116 has a mesh size that allows water to freely flow through the material when the plates 102, 104 are drawn together or pulled apart, but will not let a fish caught between the closed plates escape.

Figure 2:
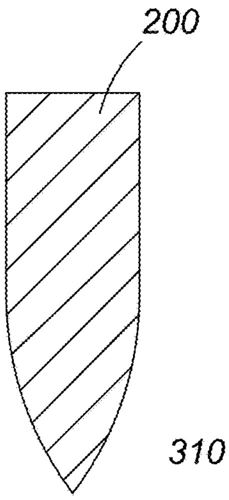
FIG. 2 is a diagram illustrating a cross-sectional view, in simplified form, of one implementation of the annular hoop portion and spokes of each plate having a tapered shape with a pointed end facing the direction the plate moves through the water to reduce the resistance encountered when the plates are closed from their open, set position.

In one implementation, the annular hoop portion and the spoke(s) of each plate have a hydrodynamic shape that reduces drag when moving through water. This facilitates the quick closure of the plates. For example, in one version as shown in FIG. 2, the cross-section 200 of the annular hoop portion (114 in FIGS. 1A-B) and spokes (112 in FIGS. 1A-B) of each plate (102, 104 in FIGS. 1A-B) has a tapered shape with a pointed end facing the direction the plate moves through the water (so downward on the upper plate and upward on the lower plate) to reduce the resistance encountered when the plates are closed at high speed. In addition, the plates can be made from a transparent material (e.g., acrylic) so that they are somewhat invisible underwater and do not scare fish away.

Referring again to FIG. 1A, in one implementation, the fish catching trap also includes a baiting feature to lure fish into swimming between the plates. In one version, the baiting feature takes the form of a fish lure 118 that is attached to the inwardly facing surface of the upper plate 102 and dangles from the upper plate when the plates are in their set position. The fish lure can be any convention fishing lure. However, the fish lure could be configured to move so as to better lure a fish. For example, the fish lure could have the shape of a fish (or worm or shrimp) and be motorized to move like live bait.

Figure 3A:
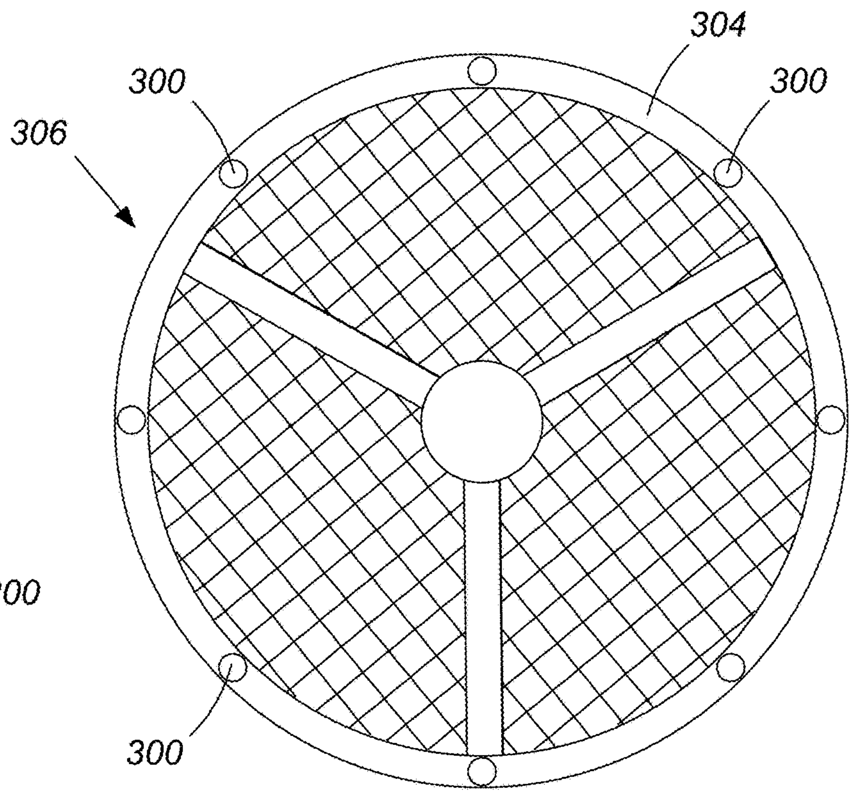
FIGS. 3A and 3B are illustrations showing, in simplified form, one implementation of a series of magnets located around the inward-facing edge of the outer rim of the upper plate and the inward-facing edge of the outer rim of the lower plate.
Figure 3B:
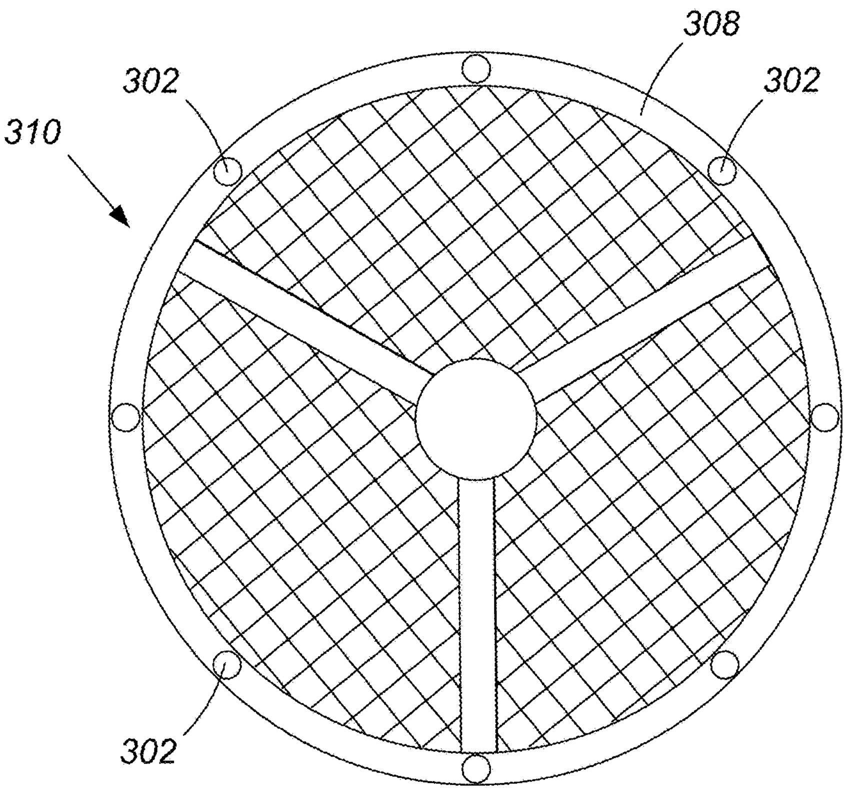
Figure 4A:
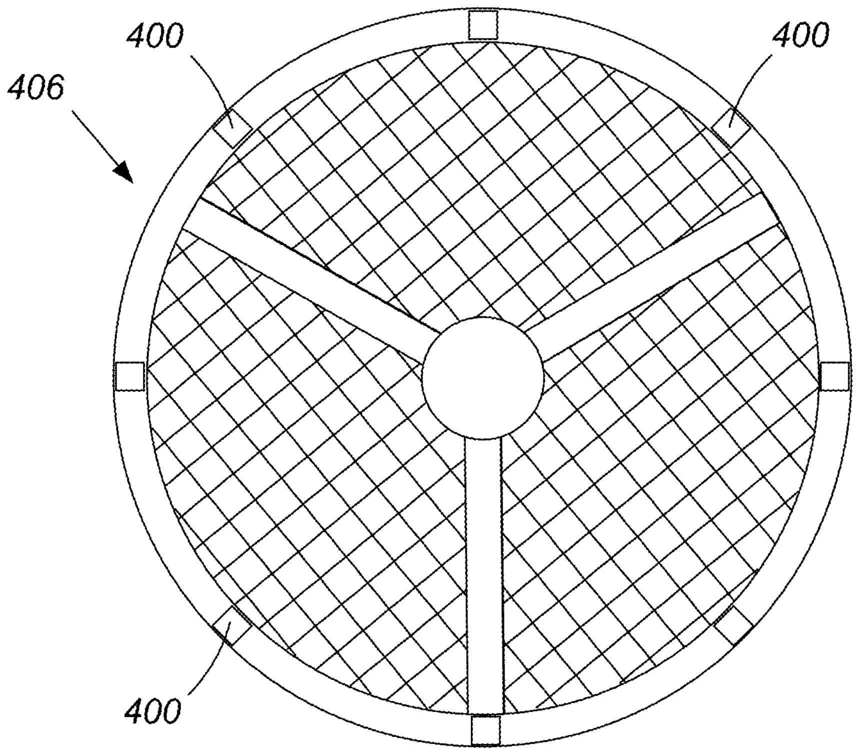
FIGS. 4A and 4B are illustrations showing, in simplified form, one implementation of a series of latch mechanisms located around the inward-facing edge of the outer rim of the upper plate and a series of correspondingly positioned catch mechanisms located around the inward-facing edge of the outer rim of the lower plate.
Figure 4B:
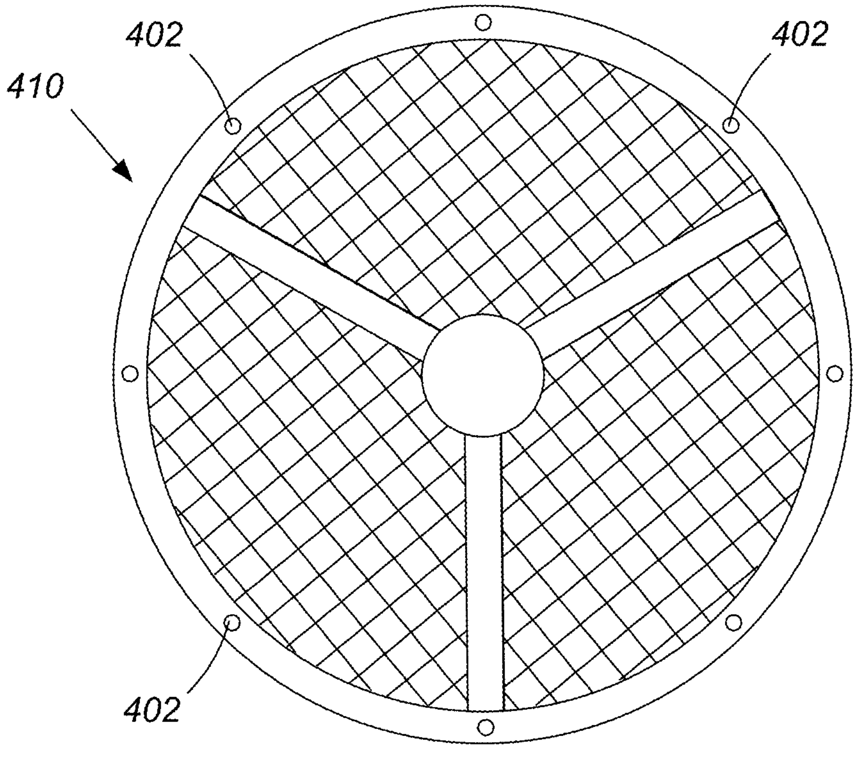

The structure of the fish catching trap when in the closed position could be relied upon to ensure a struggling fish cannot escape. However, in one implementation, a retaining feature is employed to further ensure the fish cannot force the plates apart and escape. For example, in one version shown in FIGS. 3A-B, a series of magnets 300, 302 located around the inward-facing edge 304 of the outer rim of the upper plate 306 and the inward-facing edge 308 of the outer rim of the lower plate 310 are employed. The magnets 300, 302 are equally-spaced around the outer rims and each magnet 302 on the lower plate 310 corresponds to the location of a companion magnet 300 on the upper plate 306 when the fish catching trap is in its closed position. In addition, the side of each magnet 300 on the upper plate 306 that faces the lower plate 310 and the side of its corresponding companion magnet 302 on the lower plate 310 that faces the upper plate 306 have opposite polarities so that they releasably lock the plates together. In another version shown in FIGS. 4A-B, one or more latch mechanisms 400 are installed on one of the plates (e.g., the upper plate 406 as shown in FIG. 4A) and correspondingly located catch mechanisms 402 are installed on the other plate (e.g., the lower plate 410 as shown in FIG. 4B). In the depicted implementation, the latch mechanisms 400 are located around the outer rim of the upper plate 406 and the catch mechanisms 402 are located around the outer rim of the lower plate 410. The latch 400 and catch 402 mechanisms are equally-spaced around the outer rims and each latch mechanism 400 on the upper plate 406 corresponds to the location of a companion catch mechanism 402 on the lower plate 410 when the fish catching trap is in its closed position. Each corresponding latch 400 and catch 402 mechanisms is configured to automatically and releasable lock to each other when the plates 406, 410 are closed.

The telescoping rod is spring loaded. When the fish catching trap is in the closed position, a tension coil spring located inside the rod is in an initial tension condition. As the plates are pulled apart, the spring is extended and when the plates are separated a prescribed distance corresponding to the set position, the spring is in a final tension condition. In addition, a trigger mechanism is engaged to keep the plates separated despite the tension in the spring. The spring is chosen to provide enough tension in the set position, that when the trigger mechanism is released, the spring will retract at a speed which pulls the plates into the closed position fast enough to prevent a fish that has swum between the plates from escaping. In one implementation, the fish catching trap is configured such that the plates are manually pulled apart into their set position.

Figure 5:
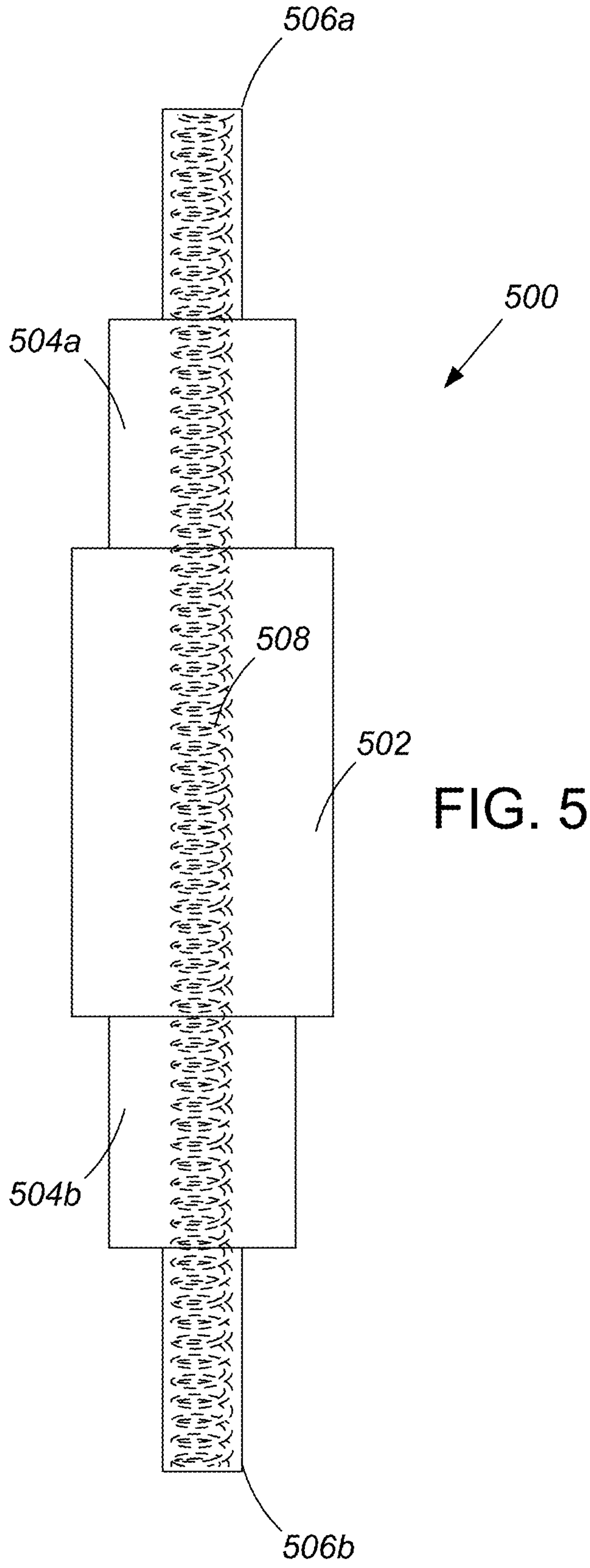
FIG. 5 is a diagram illustrating a side view, in simplified form, of one implementation of the spring-loaded telescoping rod shown in its fully extended position without the plates attached and having a series of hollow sections with a middle section and one or more distal sections on each end of the middle section which each have a diameter that is smaller than the more proximal adjacent section.

Referring to FIG. 5, in one implementation, the spring-loaded telescoping rod 500 (shown in its fully extended position without the plates attached) takes the form of a series of hollow sections with a middle section 502 that has a length approximately corresponding to the closed position of the telescoping rod and one or more distal sections (e.g., distal sections 504*a*, 506*a*, 504*b*, 506*b* shown in FIG. 5) on each end of the middle section which each have a diameter that is smaller than the more proximal adjacent section. Each distal section 504*a*, 506*a*, 504*b*, 506*b* is sized to form a sliding fit with the adjacent more proximal section, such that each distal section slides into its adjacent more proximal section of the telescoping rod 500 whenever the telescoping rod moves from the set position to the closed position and each distal section slides partially out of its adjacent more proximal section of the telescoping rod whenever the telescoping rod moves from the closed position to the set position. The tension coil spring 508 is attached at one end to an internal distal end of one of the distal-most distal sections 506*a* and attached at the other end to an internal distal end of the other distal-most distal section 506*b*. It is noted that while two distal sections are shown in FIG. 5 on each end of the middle section, there can be less or more depending on how much separation is desired between the plates of the fish catching trap.

Figure 6A:
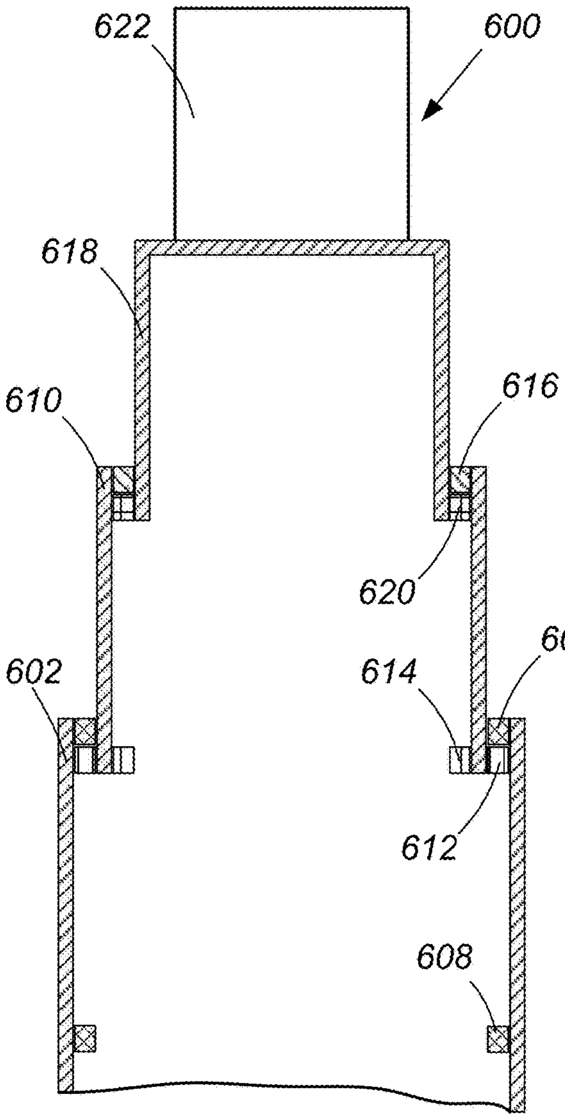
FIGS. 6A-C are diagrams illustrating a cross-sectional view, in simplified form, of one implementation of an airtight and watertight spring-loaded telescoping rod. Only a little more than half of the telescoping rod is shown for convenience since the other half is the mirror image of the depicted half. In addition, the plate is omitted, and the telescoping rod is shown in cross-section without the tension coil spring.
Figure 6B:
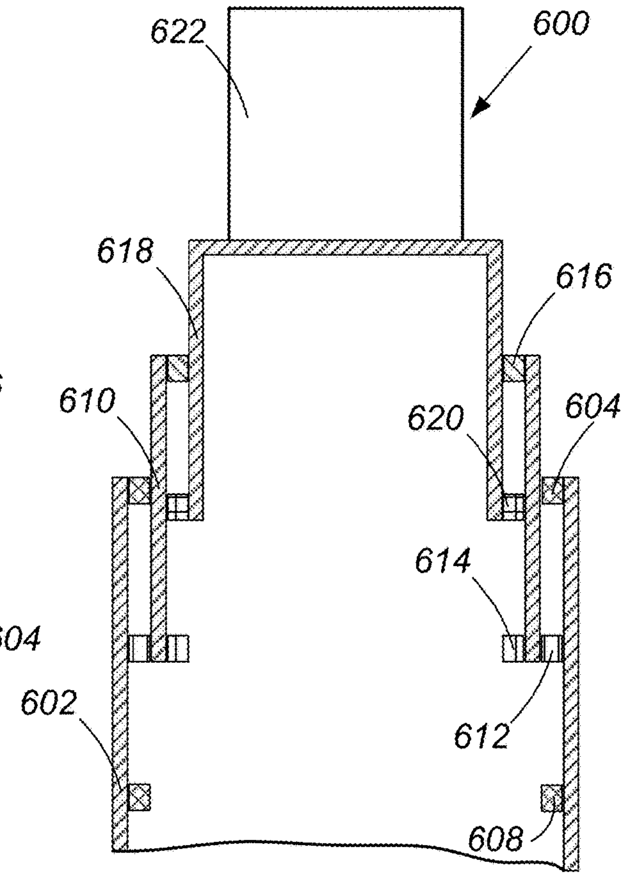
Figure 6C:
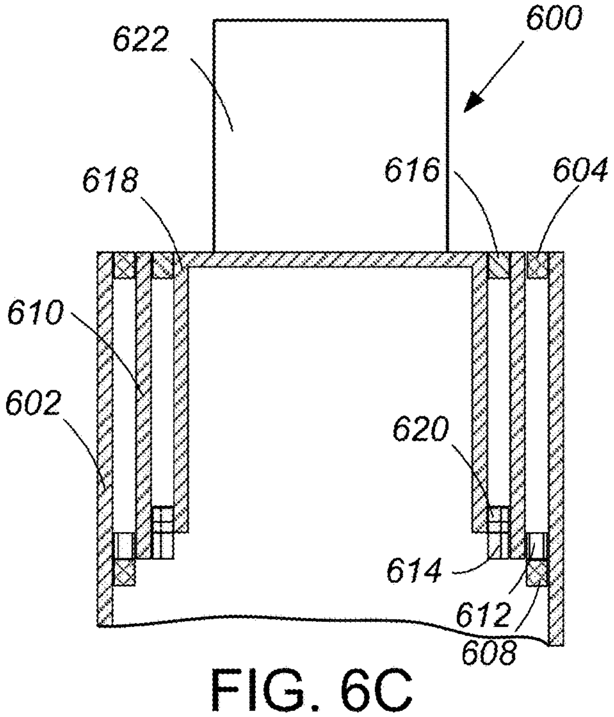

Referring to FIGS. 6A-C, in one exemplary implementation, the spring-loaded telescoping rod 600 is airtight and watertight. Only a little more than half of the telescoping rod 600 is shown in FIGS. 6A-C for convenience since the other half is the mirror image of the depicted half. In addition, the plate is omitted in FIGS. 6A-C for the purposes of clarity, and the telescoping rod 600 is shown in cross-section without the tension coil spring. FIG. 6A shows the telescoping rod in a fully extended position, FIG. 6B shows the rod in a partially retracted position, and FIG. 6C shows the rod in a fully retracted position. In this exemplary implementation, the middle section 602 has internal annular rings 604 at each end and one 608 at its longitudinal midpoint. The ring 604 extends radially inward to a degree that forms the aforementioned sliding fit between the middle section 602 and the first distal section 610 extending from the end of the middle section. In addition, the ring 604 forms a seal which prevents air from escaping from the interior of the telescoping rod 600 and prevents water from leaking into the interior of the rod from the outside. For example, in one version, the ring 604 is a piston t-seal. The longitudinal midpoint ring 608 is the same size as the other rings 604 but serves a different purpose. Namely, in conjunction with a ring 612 affixed to the exterior of the proximal end of the first distal section 610 which will be described in more detail later, the longitudinal midpoint ring 608 acts as a stop to prevent the first distal section 610 from retracting any further into the middle section 602. The first distal section 610 has a pair of internal annular rings 614, 616. The first internal annular ring 616 is located at the distal end of the first distal section 610. This ring 616 extends radially inward to a degree that forms the sliding fit between the first distal section 610 and second distal section 618 (which in this exemplary implementation is the distal-most section). In addition, the ring 616 forms a seal which prevents air from escaping from the interior of the telescoping rod 600 and prevents water from leaking into the interior of the rod from the outside. For example, in one version, the ring 616 is a piston t-seal. The second internal annular ring 614 of the first distal section 610 is the same size as the other ring 616 and is located at the proximal end of the first distal section. In conjunction with a ring 620 affixed to the exterior of the proximal end of the second distal section 618 which will be described in more detail later, the second internal annular ring 614 acts as a stop to prevent the second distal section 618 from retracting any further into the first distal section 610. The previously mentioned ring 612 affixed to the exterior of the proximal end of the first distal section 610 not only acts as a stop in conjunction with the longitudinal midpoint ring 608 of the middle section 602, but also has two other functions. First, ring 612 acts as a stop in conjunction with the internal annular ring 604 of the middle section 602 to prevent the first distal section 610 from being pulled out of the middle section. Second, ring 612 acts as a secondary seal. As such, ring 612 extends radially outward to a degree that it forms a sliding fit with the interior surface of the middle section 602 and forms a seal which prevents air from escaping from the interior of the telescoping rod 600 and prevents water from leaking into the interior of the rod from the outside. For example, in one version, the ring 612 is a piston t-seal. The second distal section 618 only has one ring, namely the previously mentioned ring 620 affixed to the exterior of the proximal end of the second distal section. The ring 620 acts as a stop in conjunction with the internal annular ring 616 of the first distal section 610 to prevent the second distal section 618 from being pulled out of the first distal section. In addition, ring 620 acts as a secondary seal. As such, ring 620 extends radially outward to a degree that it forms a sliding fit with the interior surface of the first distal section 610 and forms a seal which prevents air from escaping from the interior of the telescoping rod 600 and prevents water from leaking into the interior of the rod from the outside. For example, in one version, the ring 620 is a piston t-seal.

It is noted that in implementations of the telescoping rod having just one distal section on each end, the first distal section in the foregoing description is eliminated and the previously described second distal section becomes the only distal section. Further, in implementations of the telescoping rod having more than two distal sections on each side of the middle section, the construction of the first distal section described previously is repeated for all the intermediate distal section and the second distal section described previously becomes the last section on each end of the telescoping rod.

Figure 7:
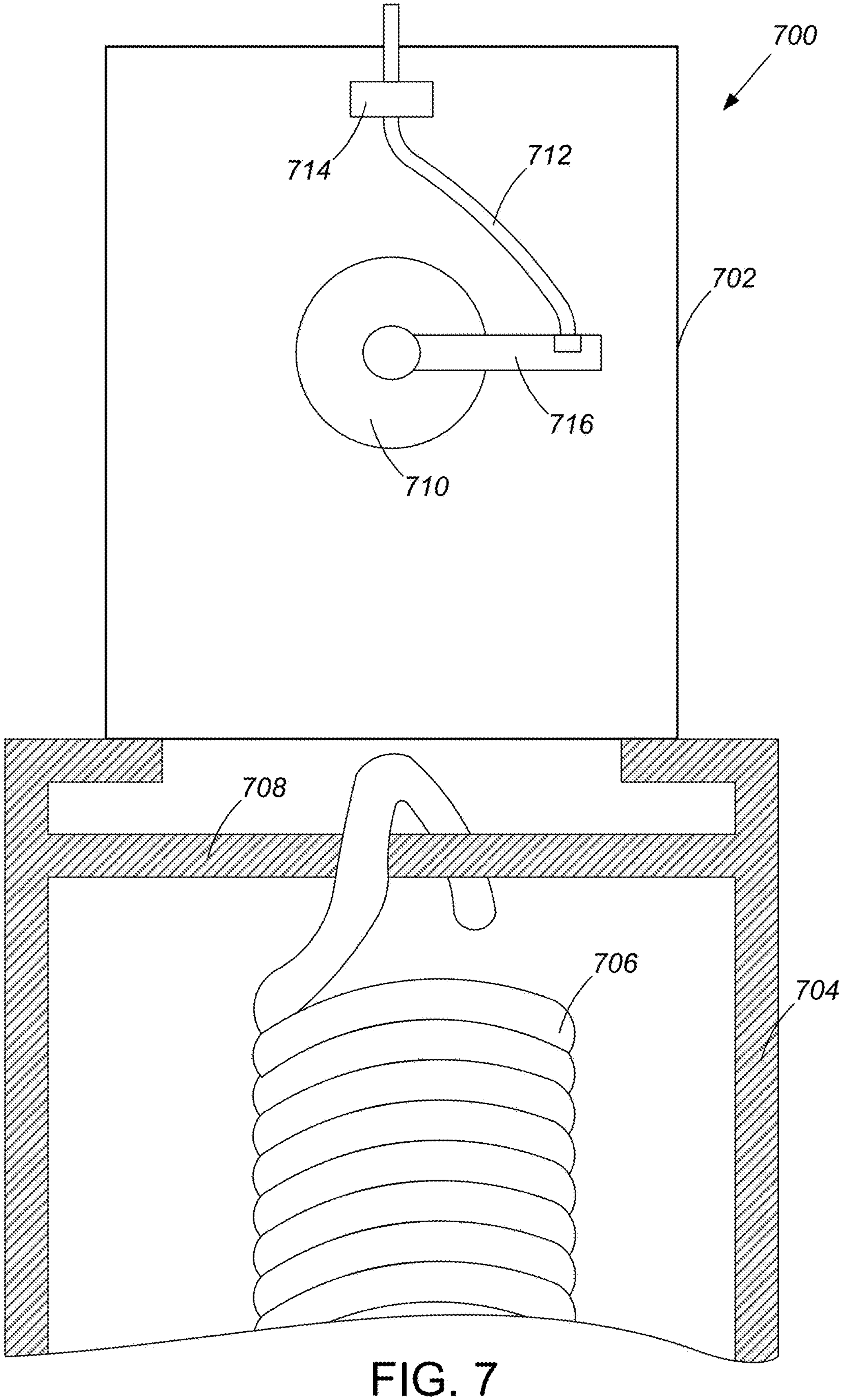
FIG. 7 is a diagram illustrating a side view, in simplified form, of one implementation of a manual version of the trigger mechanism.

The spring-loaded, watertight, and airtight implementations of the telescoping rod also include at least one extension. As can be seen in FIGS. 6A-C, the extension 622 is attached to the distal end of the distal-most section 618. A copy of the extension section can optionally be attached to the distal end of the distal-most section of the other end of the rod. In one implementation, the extension section acts as the aforementioned trigger mechanism. When the telescoping rod is extended into its set position, the interior of the rod is filled with air by any appropriate method, two of which will be described in more detail in the description to follow. Since the interior of the telescoping rod is airtight, the rod will stay extended despite the pulling force exerted by the tension coil spring, until the air is released. The extension section is employed to release the air inside the telescoping rod when triggered. Referring to FIG. 7, in a manual version of the trigger mechanism 700 where the user manually pulls the plates of the fish catch trap apart to set the trap, the extension 702 is a hollow structure which is open at the end that is attached to the distal end of the distal-most section 704 of the rod and otherwise closed. It is noted that the plate has been omitted for the purposes of clarity. The attachment to the distal-most section 704 is sealed thereby making the extension 702 airtight and watertight. The distal-most section 704 is also open at its distal end and opens into the hollow interior of the extension 702. The open end of the distal-most section 704 has an attachment for the end of the tension coil spring 706. For example, in one version there is a bar 708 that extends across the open end of the distal-most section 704. The end of the spring 706 forms a hook which is hooked to the bar 708. The extension 702 also includes one or more twist valves 710 that connect the exterior of the extension to the interior. The twist valve or valves 710 have a tab 716 on the exterior which when rotated to the vertical position opens the valve and when rotated to the horizontal position closes the valve. In operation, the user opens one or more of the twist valves 710 and pulls the plates apart. As the plates are pulled apart, the open valve(s) 710 allow air to enter the airtight interior of the telescoping rod. When the plates are pulled apart the desired distance, the user closes the open valve or valves 710 and the air is trapped inside the telescoping rod. The tension coil spring 706 will be under tension so will pull the plates together a small distance until the force preventing the telescoping rod from retracting caused by the compression of the air balances the spring's pull. This final position of the plates is the aforementioned set position. A line (e.g., cable, rope, high strength fishing line, and so on) 712 is attached to the tab on each of the valves 710 (which will be in the horizontal position). The line or lines 712 are long enough to reach the user when the fish catching trap is deployed in the water. In addition, there is a guide 714 affixed to the exterior of the extension 702 near its distal end for each twist valve 710. The line 712 from the twist valve 710 is threaded through the guide 714 which is directly above the center of rotation of the twist valve. The user pulls on the line(s) 712 to trigger the trap. When the line or lines 712 are pulled, the tab 716 on each twist value 710 on the extension is rotated into the open position and the air trapped inside the telescoping rod escapes as the tension coil spring 706 contracts and pulls the plates together into the fish catching trap's closed position.

Figure 8:
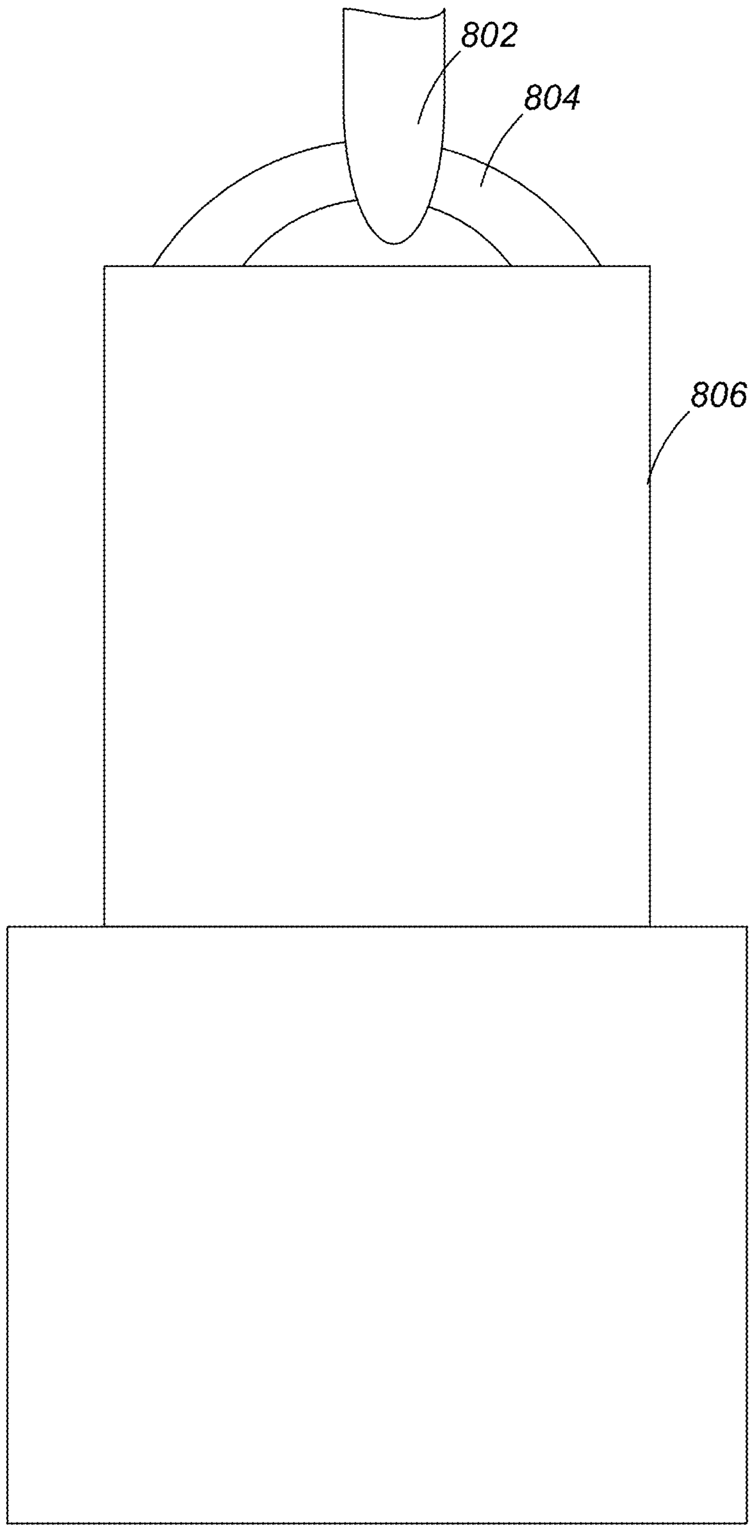
FIG. 8 is a diagram illustrating a side view, in simplified form, of one implementation of a deployment fixture attached to the distal end of the extension of the telescoping rod.

Referring to FIG. 8, the fish catching trap is deployed via a flexible line 802 (such as by a cable, rope, high strength fishing line, and so on) that is releasable connected to a deployment fixture 804 attached to the distal end of the extension 806 of the telescoping rod. For example, it could be lowered into the water from the side of a boat, or from a dock or pier. Here again, the plate has been omitted in FIG. 8 for the purposes of clarity.

1.2 Centrally-Located Transparent and Sealable Cylinder Implementations

Figure 9A:
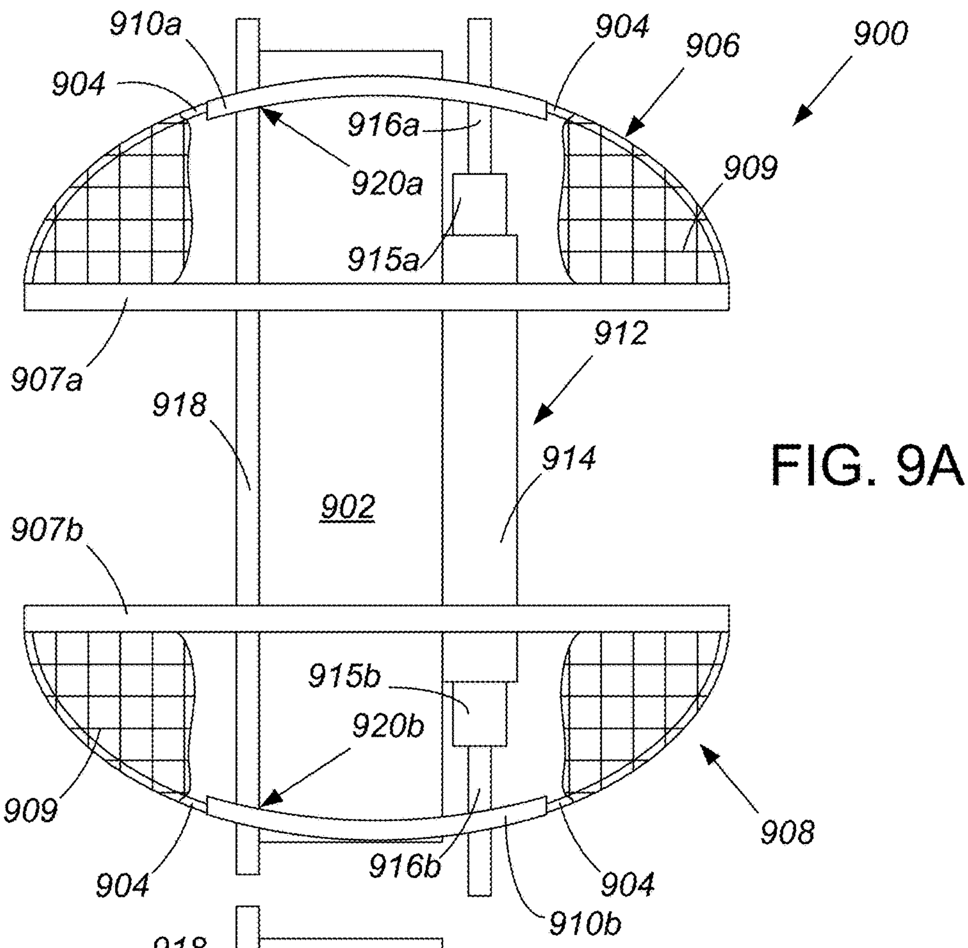
FIGS. 9A and 9B are illustrations of an exemplary implementation of a fish catching trap that includes a centrally-located transparent cylinder with dome-shaped plates that slide along the outside of the cylinder.
Figure 9B:
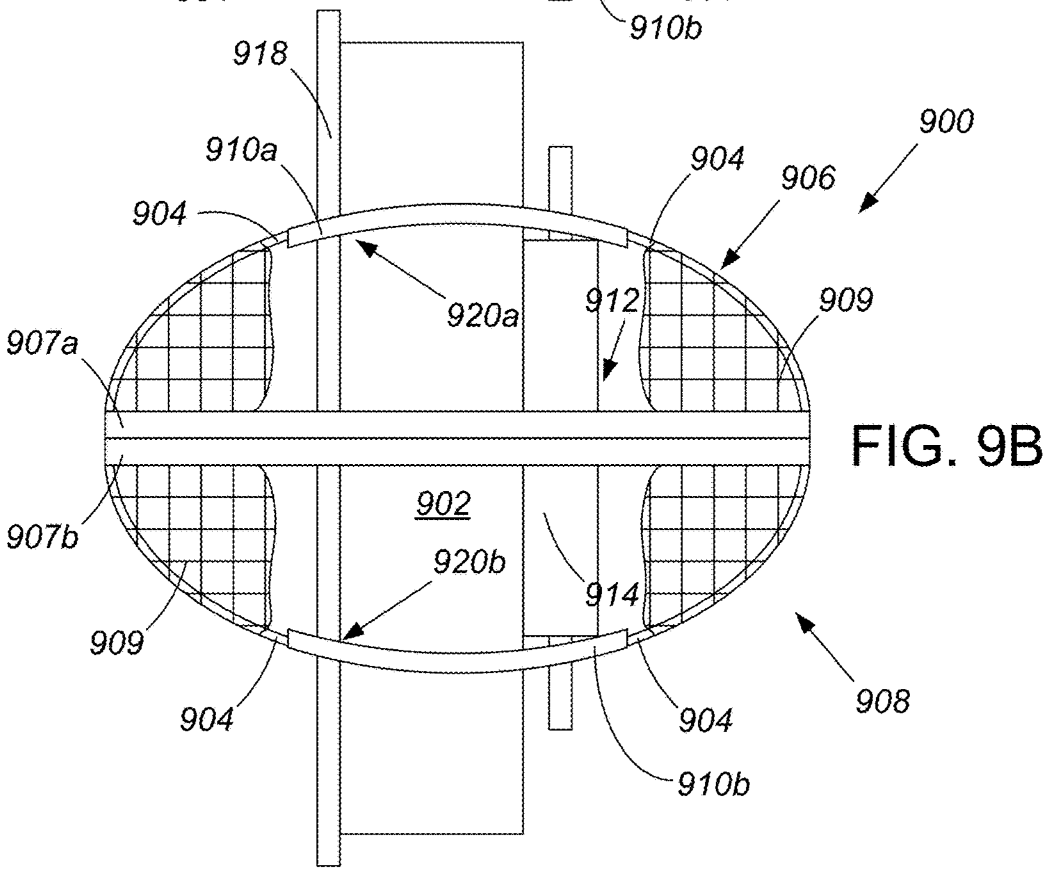

In another implementation depicted in FIGS. 9A-B, the centrally-located telescoping rod is replaced with a centrally-located transparent and sealable cylinder 902. FIG. 9A shows the fish catching trap in the set position and FIG. 9B shows the trap in the closed position. In this implementation, the spoke(s) 904 of each plate 906, 908 are attached to a centrally located ring 910*a*, 910*b* that surrounds the transparent cylinder 902 at one end and to an annular hoop portion 907*a*, 907*b* of the plates at the other end. In addition, the top of the upper plate 906 is covered with a mesh material 909 (e.g., a fishing net material), as is the bottom of the lower plate 908. This material 909 has a mesh size that allows water to freely flow through the material when the plates 906, 908 are drawn together or pulled apart, but will not let a fish caught between the closed plates escape. Each of the central rings 910*a*, 910*b* has a sliding fit with the cylinder 902 so that the associated plate can move toward the other plate when the fish catching trap 900 is in its set position and triggered to move into the closed position. Likewise, the rings 910*a*, 910*b* (and so the plates 906, 908) can slide along the cylinder 902 when the trap 900 is in its closed position, and it is then pulled into its set position. As such, the transparent cylinder 902 is at least as long as needed to support the rings 910*a*, 910*b* of the plates when the fish catching trap 900 is in the set position. A telescoping rod 912 similar to the previously described centrally-located rod extends between the plates 906, 908 and the middle section 914 of the rod is attached to the outside of the transparent cylinder 902. The extendable distal section or sections 915*a*, 915*b*, 916*a*, 916*b* at both ends of the middle section 914 allow the telescoping rod to be extendable to a set position and retractable to a closed position. The distal-most section 916*a* of the rod is attached to the bottom of the centrally-located ring 910*a* of the upper plate 906 and the distal most section 916*b* of the rod is attached to the top of the centrally-located ring 910*b* of the lower plate 908 at corresponding radial positions of the cylinder 902. In addition, there are one or more rigid guide rods 918 (one of which is shown in FIGS. 9A-B) that extend between the plates 906, 908 along the outside of the transparent cylinder 902 and intersect each plate at corresponding radial positions of the cylinder. In one version, each guide rod 918 is attached to the transparent cylinder 902, and each end of each guide rod extends through a passage or notch 920*a*, 920*b* in the centrally-located ring 910*a*, 910*b* of the associated plate. In the set position, the guide rod(s) 918 are flush with or only slightly extend beyond the exterior side of the centrally-located ring 910*a*, 910*b* of each plate. However, when the fish catching trap 900 is in its closed position, the guide rod(s) 918 extend much further beyond the exterior side of each plate 906, 908. If just one guide rod 918 is employed, it is located on the radial opposite position of the cylinder 902 from the telescoping rod 912. If more than one guide rod is employed, each guide rod and the telescoping rod are spaced at equal radial distances apart on the cylinder. The telescoping rod 912 is triggered and operates in the same manner as the previously described centrally-located rod.

It is noted that when the telescoping rod 912 is triggered while in the set position and pulls the plates 906, 908 together into the closed position, the guide rod(s) 918 cause the rings 910*a*, 910*b* of the plates to move along the transparent cylinder 902 in a plane that substantially perpendicular to a central axis of the cylinder so as to ensure a minimum of resistance to the motion. The same is true when the plates 906, 908 are pulled apart while in the closed position and placed in the set position. Further, in one version, the transparent cylinder 902 is filled with water and sealed, and includes live bait (fish, shrimp, worms, etc.) used to entice fish to swim between the plates of the fish catching trap 900.

1.3 Ancillary Equipment

The previously described fish catching trap implementations having either the centrally-located rod or the centrally-located transparent and sealable cylinder, can include one or more ancillary elements as will be described in the sections to follow.

1.3.1 Floatation Device

Figure 10:
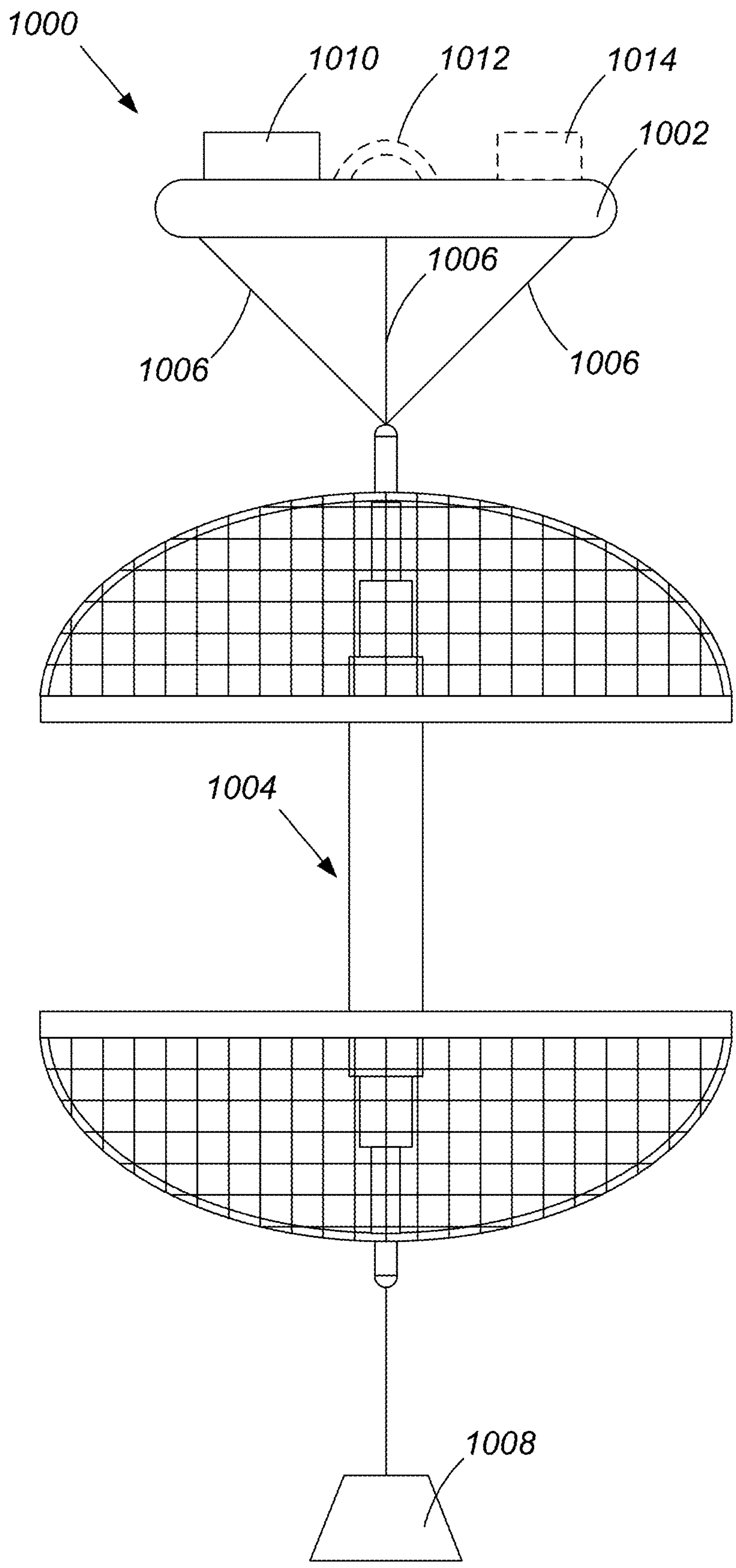
FIG. 10 is a diagram illustrating a side view, in simplified form, of one implementation of the fish catching trap that includes a floatation device that is attached to the top of the centrally-located telescoping rod via at least three equal-length lines. The lines are attached to the floatation device at different equally spaced locations. Additionally, there is a weight attached to the bottom of the centrally-located telescoping rod.

Referring to FIG. 10, the fish catching trap implementations described herein can also include a floatation device 1002 that is attached to the top of the centrally-located telescoping rod (shown) or the centrally-located transparent cylinder (not shown), depending on the configuration of the fish catching trap 1000 (which is shown in the set position in FIG. 10), via at least three equal-length lines 1006. Lines 1006 are attached to the floatation device 1002 at different equally spaced locations, and can be made from cables, ropes, high strength fishing lines, and so on. In one version, the floatation device 1002 takes the form of an annular-shaped floatation hoop. Additionally, there is a weight 1008 attached to the bottom of the central telescoping rod 1004 (or the transparent cylinder). In operation, the flotation device floats on the water's surface and the weight pulls the fish catching trap down until the lines are taut. The combination of the flotation device, lines and the weight dictate how deep the fish catching trap is in the water. Longer lines place the fish catching trap deeper, and shorter lines place the fish catching trap shallower.

In some implementations of the fish catching trap, a wireless transceiver is employed to operate various ancillary equipment to be described in subsequent sections. Referring again to FIG. 10, the wireless transceiver 1010 is attached to the top of the floatation device 1002 and can communicated wirelessly with the various ancillary equipment that are operated by the wireless transceiver, as will be described more fully in the sections to follow.

1.3.2 Remote-Controlled Triggering Device

Figure 11:
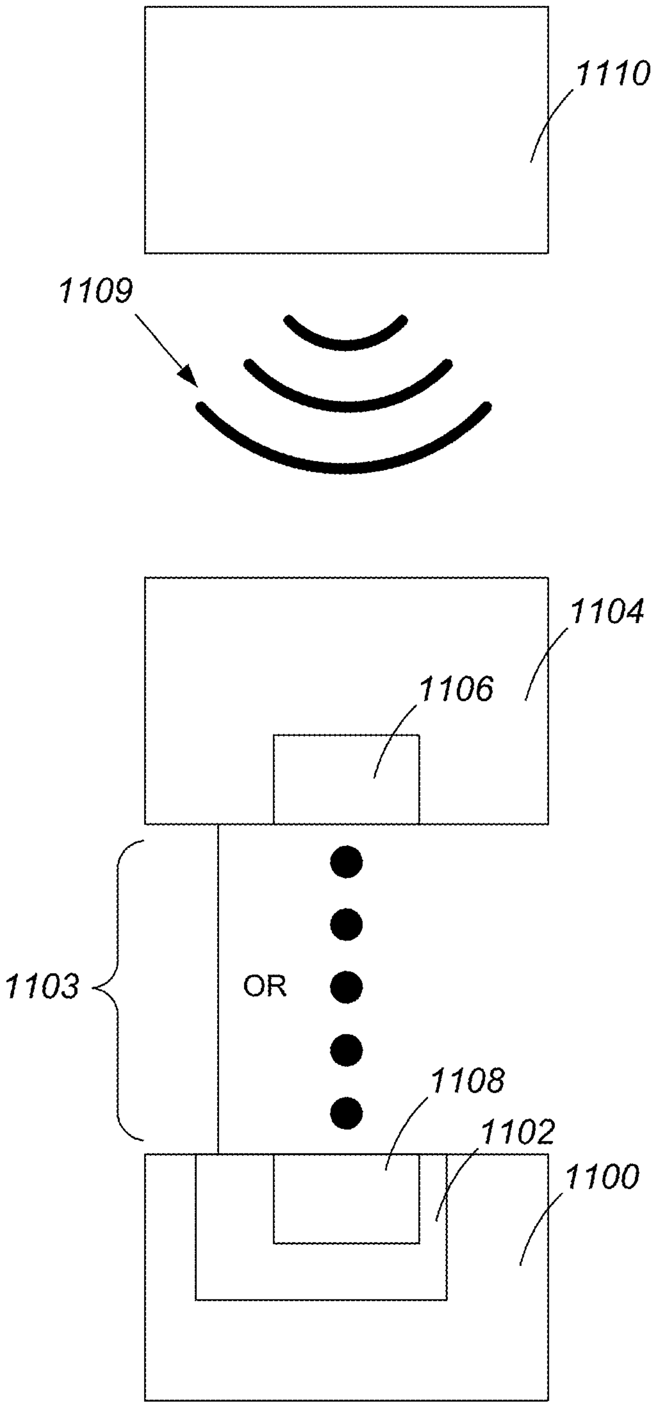
FIG. 11 is a diagram illustrating, in simplified form, one implementation of a trigger mechanism system that is released using a remote-controlled triggering device.

In an alternate implementation to the configuration where the user manually pulls on a triggering line or lines to release the trigger mechanism of the telescoping rod as described previously, referring to FIG. 11, a system including a trigger mechanism 1100 is released using a remote-controlled triggering device 1102 and the aforementioned wireless transceiver 1104 which is in electrical communication with the remote-controlled triggering device. It is noted that the term "in electrical communication with" used herein refers to either a wired (shown as a solid line in FIG. 11) or wireless communication (shown as a dotted line in FIG. 11). The remote-controlled triggering device 1102 triggers the trigger mechanism 1100 in response to a triggering signal 1103 sent by the wireless transceiver 1104 to the remote-controlled triggering device 1102. In one version, this wireless transceiver 1104 sends the triggering signal using an underwater radio frequency (RF) communication. As such the wireless transceiver 1104 includes an underwater RF communication transmitter 1106 and the remote-controlled triggering device 1102 includes an underwater RF communication receiving device 1108. The wireless transceiver 1104 sends the triggering signal in response to a triggering instruction 1109 wirelessly received from a fish catching trap controller 1110 (which will be described in more detail in a section to follow). In one version, the triggering instruction is transmitted by the controller 1110 via, for example, a relatively localized radio signal or a satellite communication link.

Figure 12:
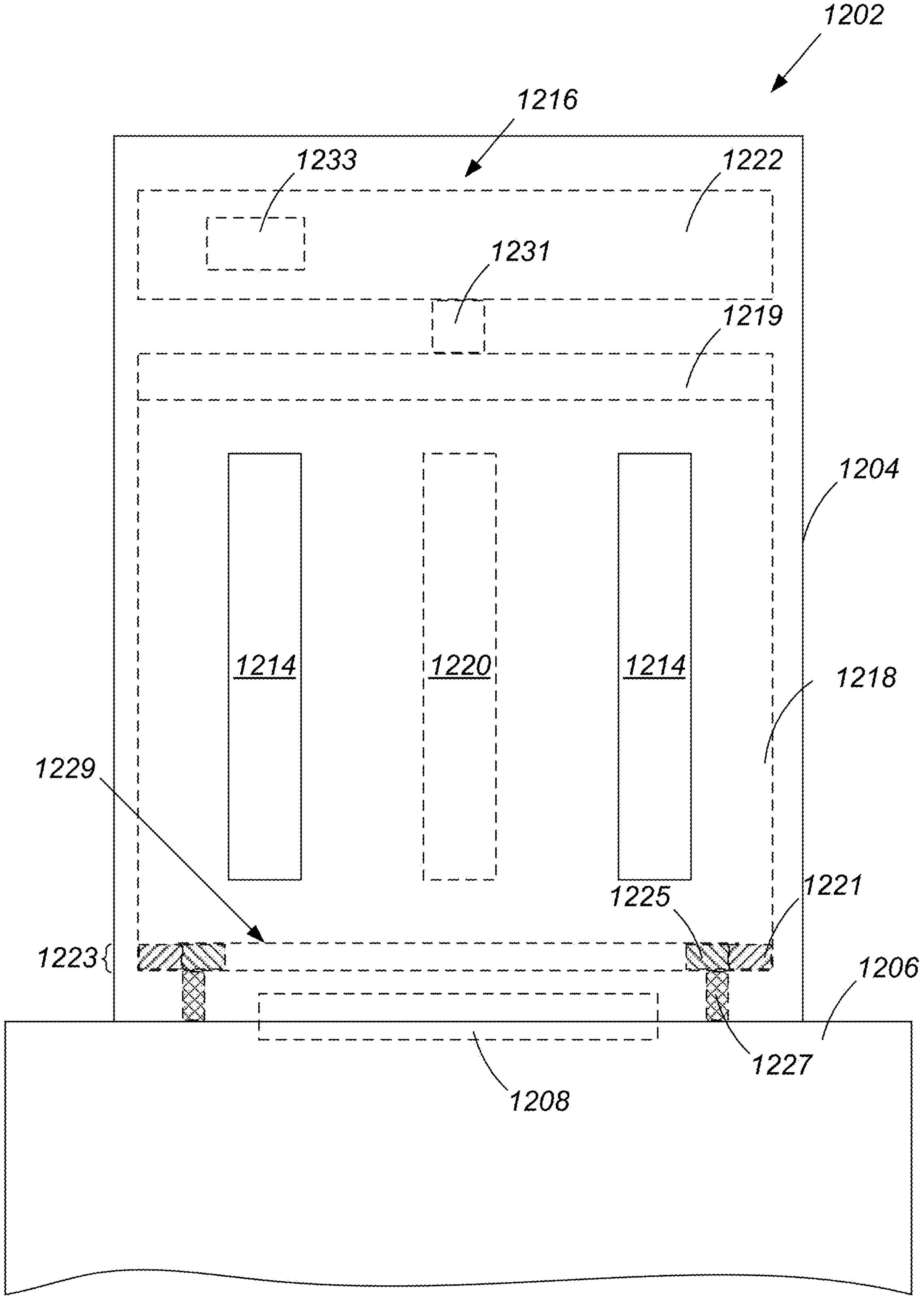
FIG. 12 is a diagram illustrating a side view, in simplified form, of one implementation of the trigger mechanism of FIG. 11.

In the remote-controlled version of the triggering device, a different trigger mechanism is employed than was used in connection with the manually triggered version. Referring to FIG. 12, in this version of the trigger mechanism 1202, the extension 1204 is still a hollow structure which is open at the end that is attached to the distal end of the distal-most section 1206 of the telescoping rod and otherwise closed. The attachment to the distal-most section 1206 is sealed thereby making the extension 1204 airtight and watertight. It is noted that the plate has been omitted in FIG. 12 for the purposes of clarity. The distal-most section 1206 is of the telescoping rod is not open in this version. Rather, a one-way valve 1208 is installed in the end of the distal most section 1206. This one-way valve 1208 opens into the hollow interior of the extension 1204 and just lets air past into the extension interior but does not allow air or water to flow into the interior of the distal-most section 1206. The distal-most section 1206 still has an attachment for the end of the tension coil spring. For example, in one version there is a bar that extends radially across the interior of the distal-most section 1206 close to the end of the section where the one-way valve 1208 is installed. The end of the spring forms a hook which is hooked to the bar. The extension 1204 includes a series of longitudinal slots 1214 that are open to the outside (two of which are shown in FIG. 12). Inside the extension 1204 is a cylindrical triggering device 1216. The cylindrical triggering device 1216 includes a hollow sealing cylinder 1218 that has a diameter that forms a sliding fit with the interior surface of the extension 1204 and has longitudinal slots 1220 that match the slots 1214 in the extension. The sealing cylinder 1218 has an exterior surface that is capable of sealing the slots 1214 in the extension except when the slots 1214 in the extension line up with the slots 1220 in the sealing cylinder. The top of the sealing cylinder 1218 is attached to a disk 1219 which rotates with the sealing cylinder and seals the top of the sealing cylinder. The bottom of the sealing cylinder 1218 is attached to the outer ring 1221 of a ring bearing 1223, and the inner ring 1225 of the ring bearing is attached to the interior surface of the bottom of the extension 1204 via an attachment ring 1227. In this way, when the sealing cylinder 1223 is rotated (as will be described shortly), the outer ring 1221 of the ring bearing rotates with it, whereas the inner ring 1225 stays stationary as it is attached to the bottom surface of the extension 1204. The bore 1229 of the ring bearing 1223 is left open so that air coming through the one-way valve 1208 from the interior of the distal-most section 1206 of the telescoping rod can flow into the hollow interior of the sealing cylinder. Above the sealing cylinder 1218 is a step motor device 1222 that is attached to the inside surface of the extension 1204 and connected via a shaft 1231 to the disk 1219. The step motor device 1222 includes an underwater RF communication receiver 1233 and when a trigger signal is received from the aforementioned wireless transceiver (see wireless transceiver 1104 in FIG. 11) it rotates the sealing cylinder 1218 into an open position where the slots 1220 of the sealing cylinder align with the slots 1214 in the extension. The step motor device 1222 is also configured such that when receiving a reset signal from the aforementioned wireless transceiver it rotates the sealing cylinder 1218 from the open position to a closed position where the slots 1214 in the extension do not align with the slots 1220 in the sealing cylinder and the exterior surface of the sealing cylinder seals the extension slots such that no water or air can get in or out. In operation, assuming the fish catching trap is in its set position and the extension slots 1214 are sealed, receipt of the trigger signal by the step motor device 1222 causes it to rotate the sealing cylinder 1218 into the aforementioned open position where the extension slots are aligned with the sealing cylinder slots 1220. This causes the air that was trapped in the interior of the telescoping rod when it was placed in the set condition to flow out of the aligned slots 1214, 1220 as the tension coil spring pulls the plates of the trap downward into the trap's closed position. It is noted that some water may enter the interior of the extension 1204 during the triggering procedure. However, the aforementioned one-way valve 1208 in the top of the distal-most segment 1206 will prevent water from entering the interior of the telescoping rod. As will be described in a section to follow, in some implementations, the fish catching trap can be reset from the closed position to the set position.

It is noted that underwater RF communication signals have a limited range. If the fish catching trap is to be located at a depth that is too far for an underwater RF communication signal from the wireless transceiver to reach it, then a series of underwater RF communication relay transceivers can be employed. The underwater RF communication relay transceivers are located at different depths, but still within communication distance from the preceding and subsequent relay transceiver. The first underwater RF communication relay transceiver (i.e., shallowest) receives a triggering or reset signal from the wireless transceiver and passes the signal on to the next underwater RF communication relay transceiver depth-wise, and so on until the step motor device receives the signal.

1.3.3 Remote-Controlled Extension Mechanism

Figure 13:
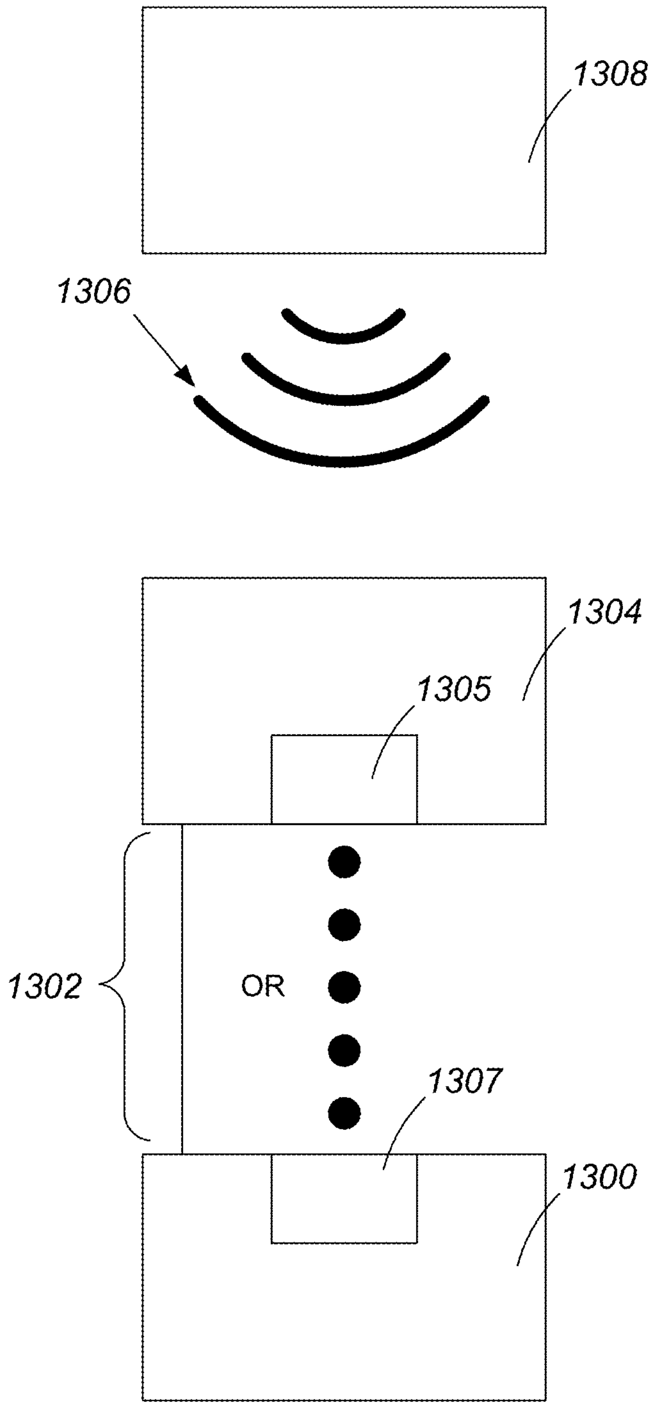
FIG. 13 is a diagram illustrating, in simplified form, one implementation a remote-controlled extension mechanism system employed to extend the telescoping rod into its set position.

In an alternate implementation to the configuration where the user manually pulls the plates apart to set the fish catching trap as described previously, referring to FIG. 13, a system including a remote-controlled extension mechanism 1300 is employed to extend the telescoping rod into its set position. The remote-controlled extension mechanism 1300 extends the telescoping rod (and so separates the plates) into the previously described set position from the closed position in response to an extension signal 1302 received from the aforementioned wireless transceiver 1304 which is in electrical communication with the remote-controlled extension mechanism. In one version, the wireless transceiver 1304 sends the triggering signal using an underwater radio frequency (RF) communication. As such the wireless transceiver 1304 includes an underwater RF communication transmitter 1305 and the remote-controlled triggering device 1300 includes an underwater RF communication receiving device 1307. The wireless transceiver 1304 sends the extension signal in response to an extension instruction 1306 wirelessly received from the fish catching trap controller 1308. In one version, the extension instruction 1306 is transmitted by the controller 1308 via, for example, a relatively localized radio signal or a satellite communication link.

Figure 14:
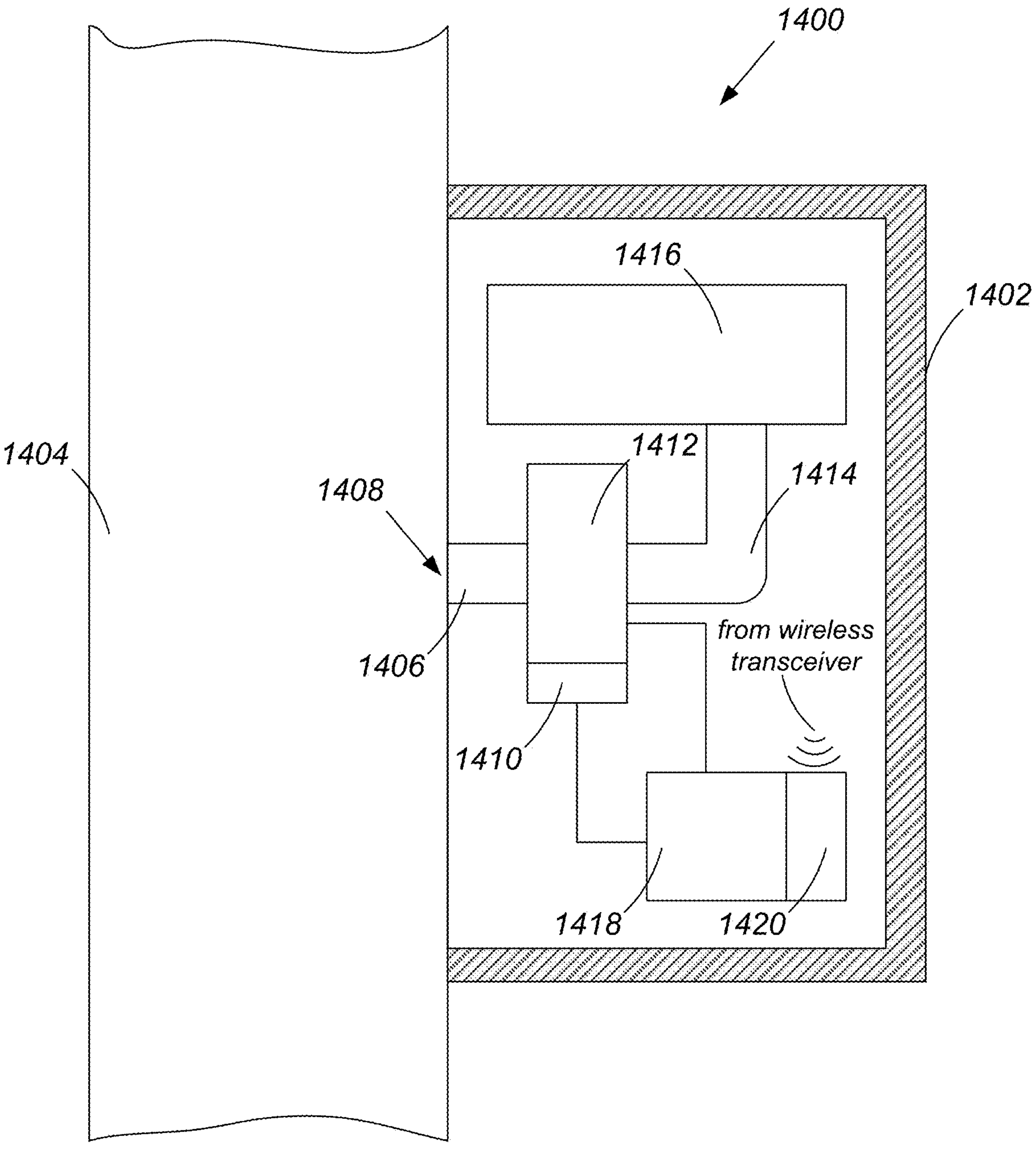
FIG. 14 is a diagram illustrating a side view, in simplified form, of one implementation of the remote-controlled extension mechanism of FIG. 13.

Referring to FIG. 14, in one version, the remote-controlled extension mechanism 1400 includes a watertight enclosure 1402 that is attached to middle section 1404 of the telescoping rod. Inside the enclosure 1402 are several components used to extend the telescopic rod using air pressure. More particularly, a tube 1406 is attached at one end to a passage 1408 in the middle section 1404. The passage 1408 extends through the wall of the middle section 1404 near the longitudinal midline to the interior of the section. The tube 1406 is attached at its other end to a one-way valve 1412, which is in turn connected via a compressed gas supply tube 1414 to a compressed gas reservoir 1416. The one-way valve also includes a pressure sensor 1410 that measures the pressure of air inside the telescoping rod. All the foregoing attachments and connections are airtight. The one-way value 1412 is of the type that can be opened or closed via a valve signal sent from a valve controller unit 1418 that is electrically connected to the valve. When open, air can only flow through the valve 1412 into the tube 1406 leading to the middle section 1404 of the telescoping rod. The output of the pressure sensor 1410 is also electrically connected to the valve controller unit 1418, and the valve controller unit includes an underwater RF receiver 1420. The valve controller unit 1418 provides power to the one-way valve 1412 and pressure sensor 1410. In operation, when the fish catching trap is in its closed position and the underwater RF receiver 1420 of the valve control unit 1418 receives the aforementioned extension signal from the wireless transceiver (see the wireless transceiver 1304 in FIG. 13) the valve control unit opens the one-way valve 1412. This allows air to flow from the compressed gas reservoir 1416 into the interior of the telescoping rod. The pressure exerted by the air entering the interior of the telescoping rod extends the rod. The valve control unit 1418 monitors the readout signal from the pressure sensor 1410 and closes the one-way valve 1412 when the air pressure inside the telescoping rod reaches a prescribed pressure indicative of the rod being extended into it set position. It is noted that the compressed gas reservoir 1416 contains enough air at a sufficient pressure to extend the telescoping rod into its set position at least twice. Alternately, the compressed gas reservoir 1416 can contain a gas other than air, such as nitrogen.

As with the remote-controlled triggering device, since underwater RF communication signals have a limited range, the previously-described series of underwater RF communication relay transceivers can be employed to get the extension signal to the remote-controlled extension mechanism.

1.3.4 Lights

Figure 15:
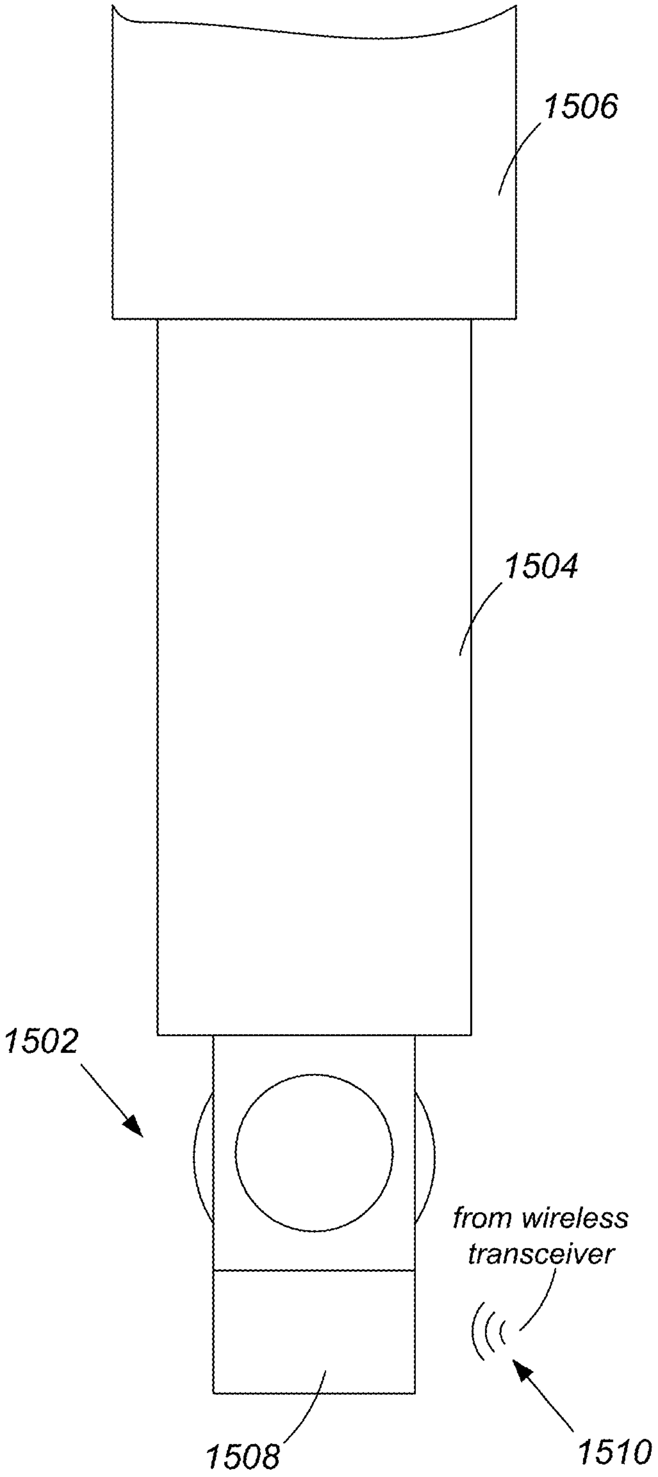
FIG. 15 is a diagram illustrating a side view, in simplified form, of one implementation of the fish catching trap having one or more lights attached to the bottom of the centrally-located telescoping rod.

The fish catching trap implementations can also include one or more lights attached to the bottom of the centrally located telescoping rod, or the transparent cylinder, depending on the configuration of the trap. For example, referring to FIG. 15, in one implementation, the light or lights 1502 can be attached to the bottom of the extension 1504 that is attached to the end of the lower distal-most section 1506 of the centrally-located telescoping rod. It is noted that the lower plate is not shown in FIG. 15 for the purposes of clarity.

The light or lights 1502 are used to further lure fish, especially at night. In one version, the light(s) 1502 are simply turned on prior to deployment of the fish catching trap. In another version, the light(s) 1502 are remotely controlled. In this latter version, the light(s) 1502 are electrically connected to an underwater RF receiver 1508 and they are turned on or off by the underwater RF receiver in response to an on-off signal 1510 received from the previously described wireless transceiver (see wireless transceiver 1010 in FIG. 10). The wireless transceiver sends the on-off signal in response to an on-off instruction wirelessly received from the fish catching trap controller. In one version, the on-off instruction is transmitted by the controller via, for example, a relatively localized radio signal or a satellite communication link.

As with the remote-controlled triggering device, since underwater RF communication signals have a limited range, the previously-described series of underwater RF communication relay transceivers can be employed to get the on-off signal to the remote-controlled light or lights.

1.3.5 Cameras

Figure 16A:
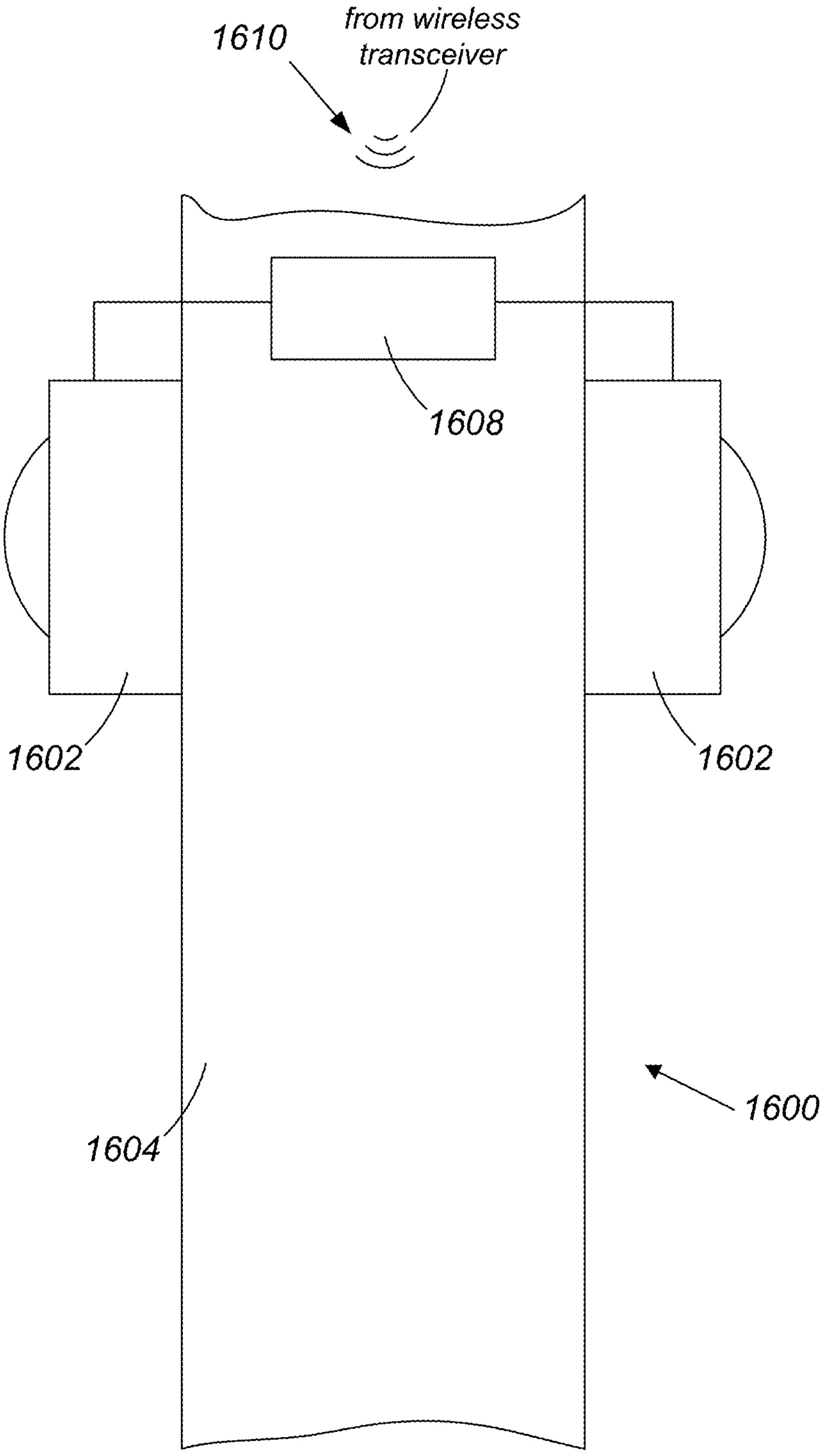
FIG. 16A is a diagram illustrating a side view, in simplified form, of one implementation of the fish catching trap having cameras attached to the middle section of the centrally-located telescoping rod.
Figure 16B:
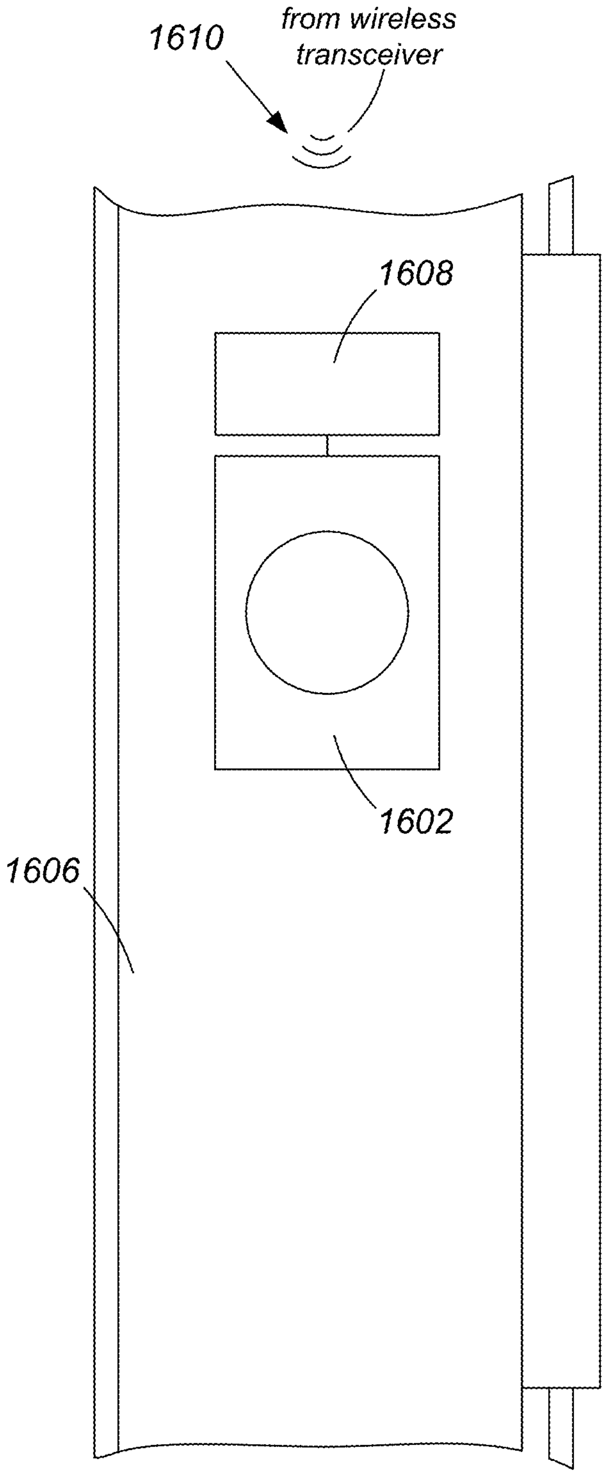
FIG. 16B is a diagram illustrating a side view, in simplified form, of one implementation of the fish catching trap having a camera attached to the centrally-located transparent cylinder.

Referring to FIG. 16A, the fish catching trap implementations employing a centrally-located telescoping rod 1600 can also include one or more water-proof cameras 1602 (two of which are shown) that are attached to the outside of the middle section 1604 of the rod. Referring to FIG. 16B, in fish catching trap implementations that employ the centrally-located transparent cylinder 1606, the water-proof camera or cameras 1602 (one of which is shown) can be attached to the outside of the cylinder. In an alternate implementation (not shown), the water-proof camera or cameras are mounted inside the transparent cylinder, rather than on its exterior.

In all the foregoing implementations, the camera or cameras are placed so that the area between the plates can be imaged to detect if a fish has swum therebetween. The camera or cameras employed can be configured to image part of the area between the plates or all of it. For example, multiple cameras whose field of views add up to 360 degrees can be placed around the centrally-located rod or transparent cylinder at locations that allow all of the area between the plates to be imaged. Fewer cameras (i.e., whose fields of view do not add up to 360 degrees) can be employed if only a part of the area between the plates is to be imaged. In the implementations employing the centrally-located transparent cylinder, a single omni-directional camera could be placed inside the cylinder to image the entire area between the plates.

In one implementation, the camera(s) are capable of recording and saving images and videos. As such, in one version, the camera(s) are simply turned on and set to record images/videos prior to deployment of the fish catching trap. The recorded images/videos can then be retrieved from the camera(s) once the fish catching trap is retrieved. However, in another version, the camera or cameras are remotely controlled to turn them on and off, as well as to instruct them to capture images and videos, transfer the images and videos they capture, record the images and videos, and perform other functions. As shown in FIG. 16A or 16B, to realize this remote-controlled version, the camera(s) 1602 are electrically connected to an underwater RF transceiver 1608 and the foregoing functions are initiated by the underwater RF transceiver in response to camera signals 1610 received from the previously described wireless transceiver (see wireless transceiver 1010 in FIG. 10). The wireless transceiver sends the camera signals in response to camera instructions wirelessly received from the fish catching trap controller. In one version, the camera instructions are transmitted by the controller via, for example, a relatively localized radio signal or a satellite communication link.

As with the remote-controlled triggering device, since underwater RF communication signals have a limited range, the previously-described series of underwater RF communication relay transceivers can be employed to get the camera signals to and from the remote-controlled camera or cameras.

1.3.6 Fish Capturing Trap Controller

Figure 17:
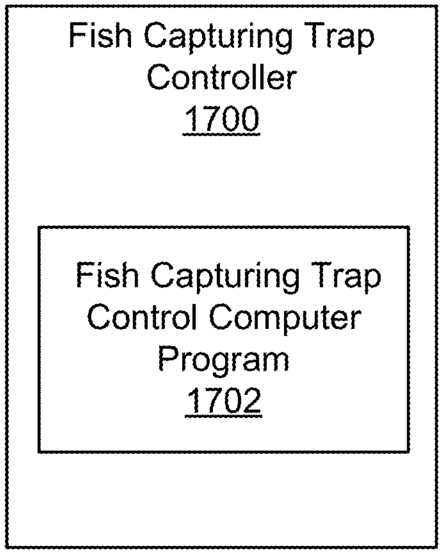
FIG. 17 is a diagram illustrating one implementation, in simplified form, of a fish catching trap controller and its fish catching trap control computer program.

Referring to FIG. 17, the previously mentioned fish capturing trap controller 1700 is made up of one or more computing devices (such as those described in Section 3.0 of this description) and runs a fish catching trap control computer program 1702 that includes a plurality of sub-programs executable by the computing device or devices of the controller. In general, the sub-programs configure the computing device or devices to control, via instructions transmitted to the wireless transceiver, at least one of the remote-controlled triggering device, remote-controlled extension mechanism, at least one remote-controlled light, at least one remote-controlled underwater camera, as well as potentially other features. It is noted that a transceiver is not strictly required unless camera(s) are being controlled. However, in non-camera using implementations of the fish catching trap, such as those employing one or more of a remote-controlled triggering device, a remote-controlled extension mechanism, or an at least one remote-controlled light, a transceiver can be used instead of a receiver.

In addition to the previously described tasks that the fish capturing trap controller performs, other tasks can be performed as will be described in more detail in the subsections to follow.

1.3.6.1 Automating Fish Capturing Trap Operations

Figure 18:
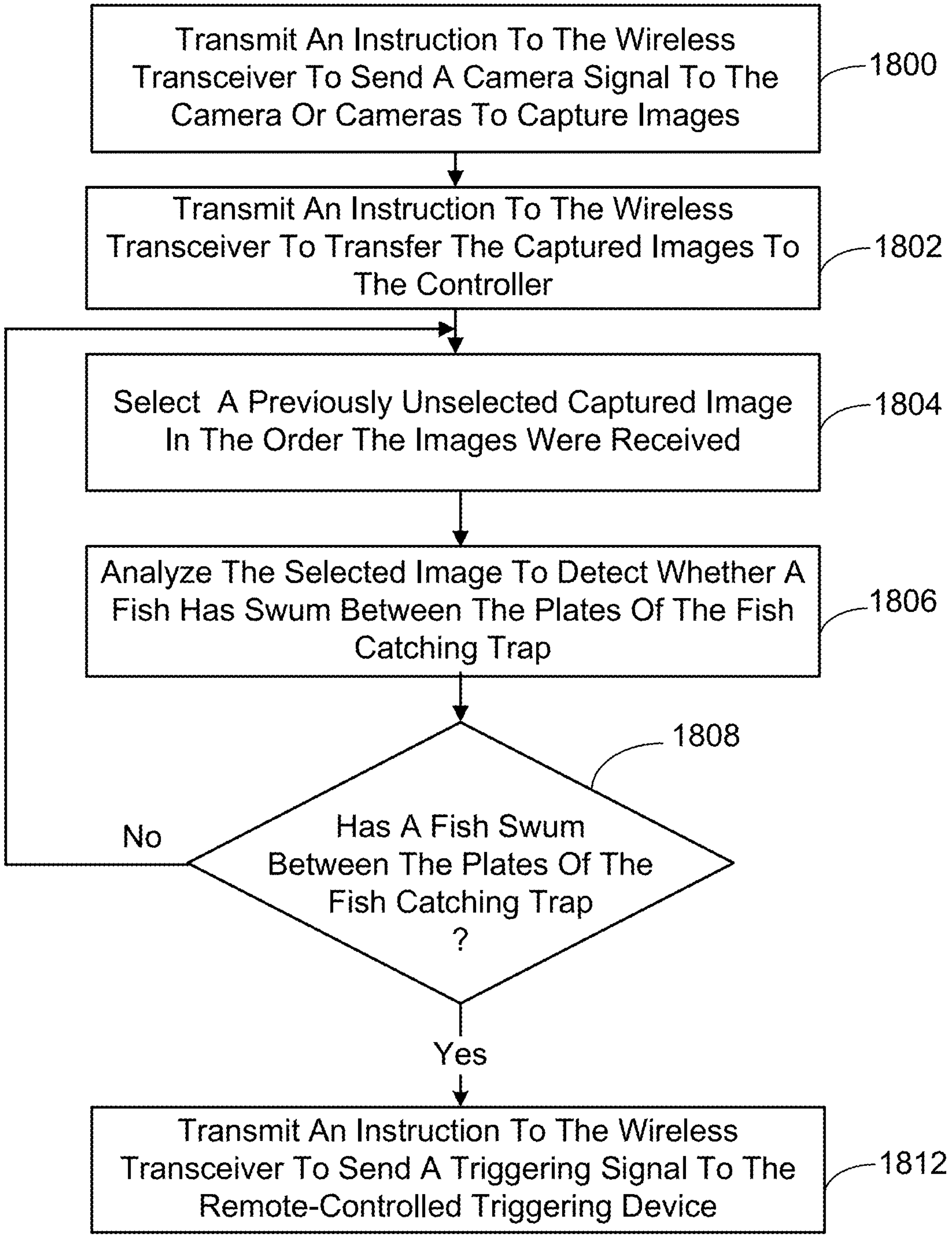
FIG. 18 is a diagram illustrating one implementation, in simplified form, of sub-programs of the fish catching trap control computer program for controlling the remote-controlled triggering device and at least one remote-controlled underwater camera to trap fish.

In one implementation, the fish catching trap controller is used to automate fish trapping operations. For example, images of a fish that has swum between the plates can be captured by a camera and used to automatically trigger the remote-controlled triggering device, thereby trapping the fish without the need for a user to interface with the controller. More particularly, referring to FIG. 18, in one implementation, the sub-programs of the fish capturing trap computer program for controlling the remote-controlled triggering device and at least one remote-controlled underwater camera, includes tasks for automating the fish catching trap. These automation tasks include the controller transmitting instructions to the wireless transceiver to send a camera signal to the cameras or cameras to capture images 1800 and to transfer the captured images to the controller 1802. Each captured image received is selected in the order it was received 1804 and is analyzed to detect if a fish has swum between the plates of the fish catching trap 1806. If such a fish is found in the image being analyzed 1808, then instructions are transmitted to the wireless transceiver to send a triggering signal to the remote-controlled triggering device to trigger the trigger mechanism 1812. This results in the fish catching trap being triggered, the plates closing, and the fish being trapped. Otherwise, if no fish is detected in the selected image, actions 1804 through 1812 are repeated for each subsequently received image.

Figure 19:
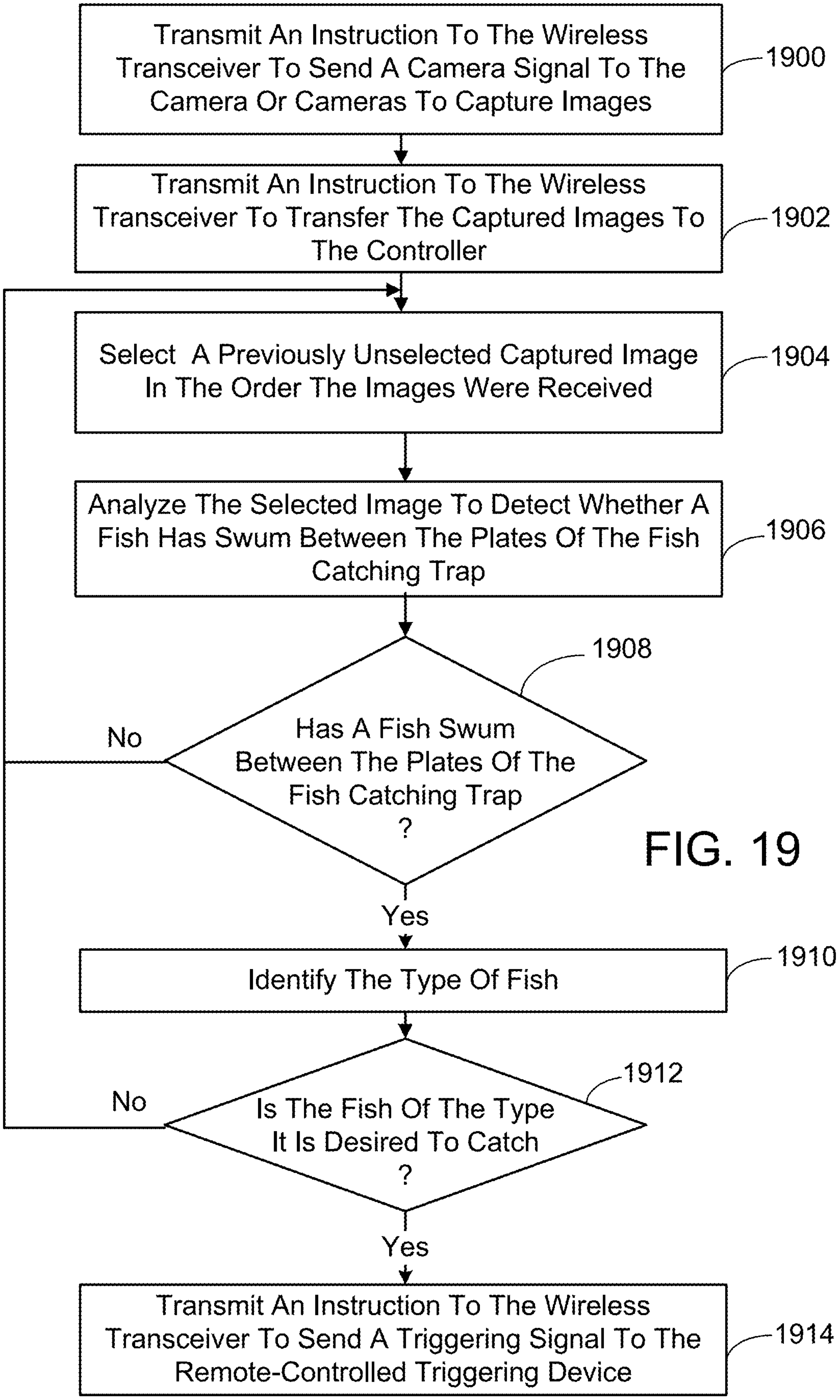
FIG. 19 is a diagram illustrating one implementation, in simplified form, of sub-programs of the fish catching trap control computer program for controlling the remote-controlled triggering device and at least one remote-controlled underwater camera to trap a pre-specified type or types of fish.

Further, a fish recognition feature can be included that recognizes the type of fish that has swum between the plates and only captures specific types of fish. Thus, unless the fish recognition feature recognizes a fish that is on the capture list, the fish catching trap is not triggered. More particularly, referring to FIG. 19, in one implementation, the sub-programs of the fish capturing trap computer program for controlling the remote-controlled triggering device and at least one remote-controlled underwater camera, includes the following tasks. First, the controller transmits instructions to the wireless transceiver to send a camera signal to the cameras or cameras to capture images 1900 and to transfer the captured images to the controller 1902. Each captured image received is selected in the order it was received 1904 and is analyzed to detect if a fish has swum between the plates of the fish catching trap 1906. If it is detected that a fish has swum between the plates of the fish catching trap in the currently selected image 1908, the type of fish is identified 1910 and it is determined if the identified fish is of a type that has been predetermined to be a type of fish it is desired to catch 1912. If it is determined that the fish is of a type that has been predetermined to be a type of fish it is desired to catch, then instructions are transmitted to the wireless transceiver to send a triggering signal to the remote-controlled triggering device to trigger the trigger mechanism 1914. This results in the fish catching trap being triggered, the plates closing, and the fish being trapped. Otherwise, if no fish is detected in the selected image, or if a fish was detected but it is not of a type that has been predetermined to be a type of fish it is desired to catch, then actions 1904 through 1914 are repeated for each subsequently received image.

1.3.6.2 Fish Capturing Trap Operations with User Input

Figure 20:
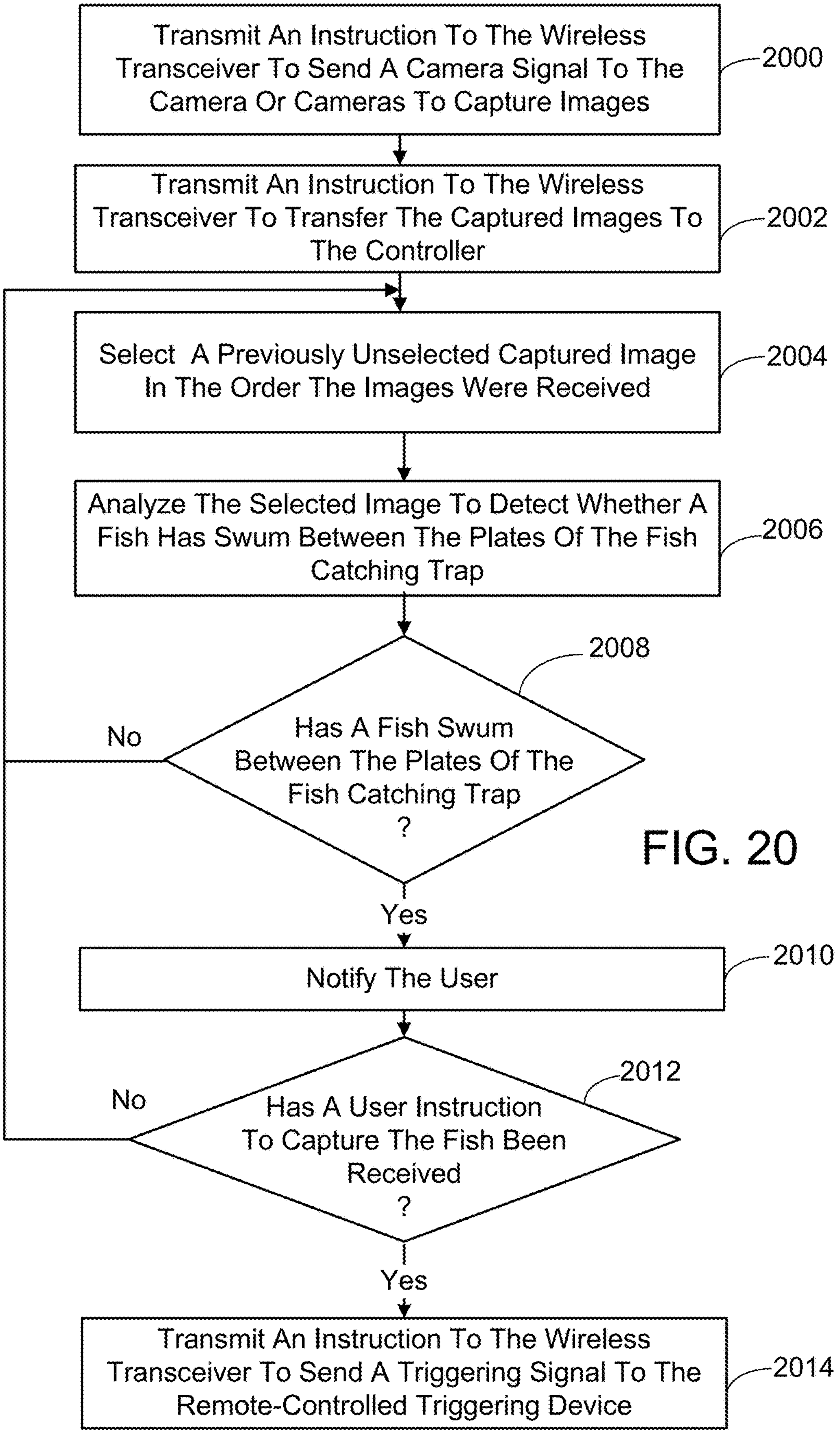
FIG. 20 is a diagram illustrating one implementation, in simplified form, of sub-programs of the fish catching trap control computer program for controlling the remote-controlled triggering device and at least one remote-controlled underwater camera to trap fish based on a user instruction to do so.

In one implementation of the fish capturing trap, a user feature can be included. In this implementation, the controller includes a user interface which notifies a user that a fish has been detected and a user input that receives instructions from the user if the user wants to capture the fish. The user interface and user input can be any appropriate devices, such as those described in Section 3.0. More particularly, referring to FIG. 20, in one implementation, the sub-programs of the fish capturing trap computer program for controlling the remote-controlled triggering device and at least one remote-controlled underwater camera, includes the following tasks. First, the controller transmits instructions to the wireless transceiver to send a camera signal to the cameras or cameras to capture images 2000 and to transfer the captured images to the controller 2002. Each captured image received is selected in the order it was received 2004 and is analyzed to detect if a fish has swum between the plates of the fish catching trap 2006. If it is detected that a fish has swum between the plates of the fish catching trap in the currently selected image 2008, the user is informed via the user-interface device that a fish that has swum between the plates of the fish catching trap 2010. Whenever a user instruction to capture the detected fish is received via the user-input device 2012, instructions are transmitted to the wireless transceiver to send a triggering signal to the remote-controlled triggering device to trigger the trigger mechanism 2014. This results in the fish catching trap being triggered, the plates closing, and the fish being trapped. Otherwise, if no fish is detected in the selected image, or if a user instruction to capture the detected fish is not received, then actions 2004 through 2014 are repeated for each subsequently received image.

Figure 21A:
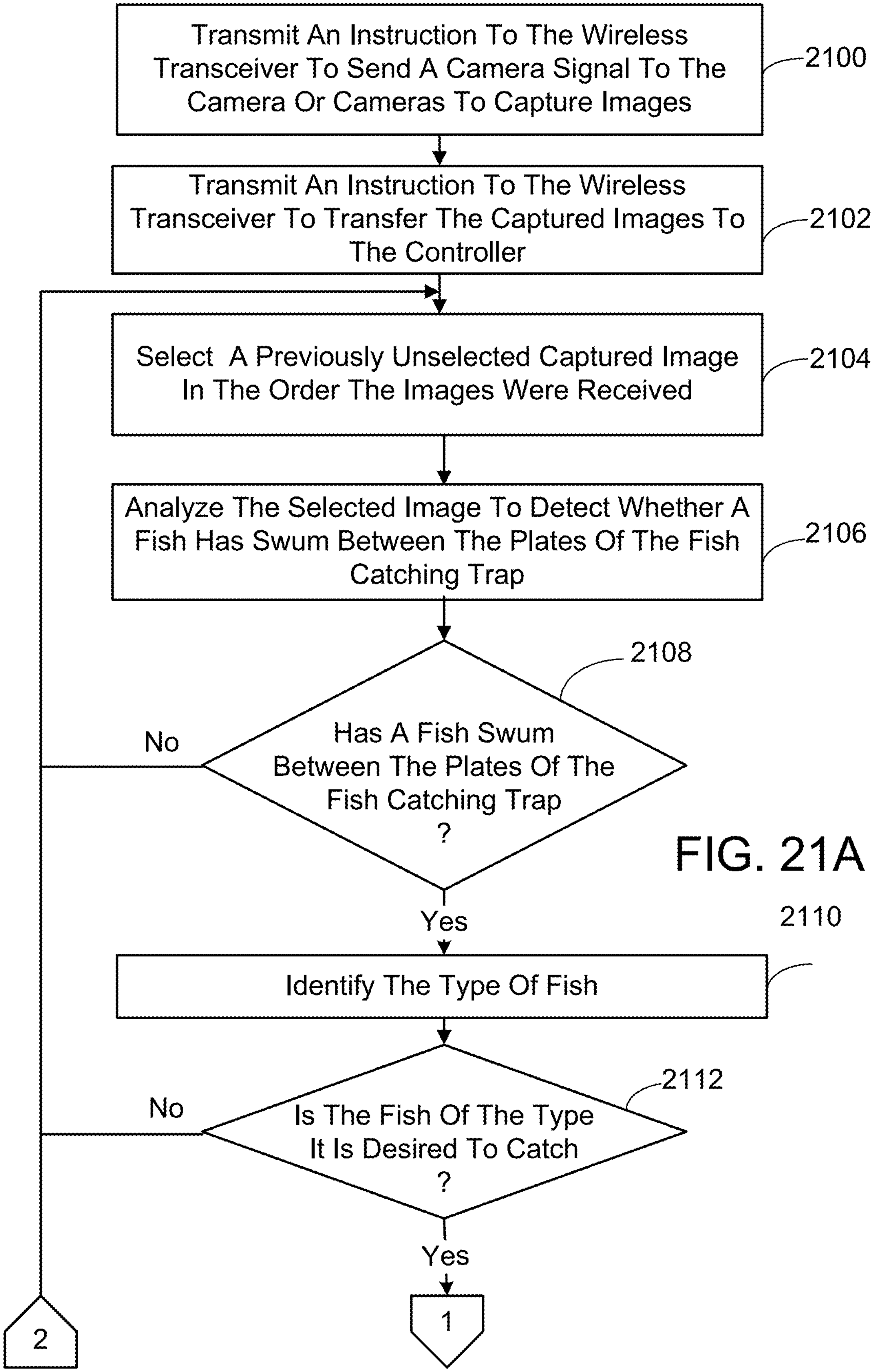
FIG. 21 is a diagram illustrating one implementation, in simplified form, of sub-programs of the fish catching trap control computer program for controlling the remote-controlled triggering device and at least one remote-controlled underwater camera to trap a pre-specified type or types of fish based on a user instruction to do so.
Figure 21B:
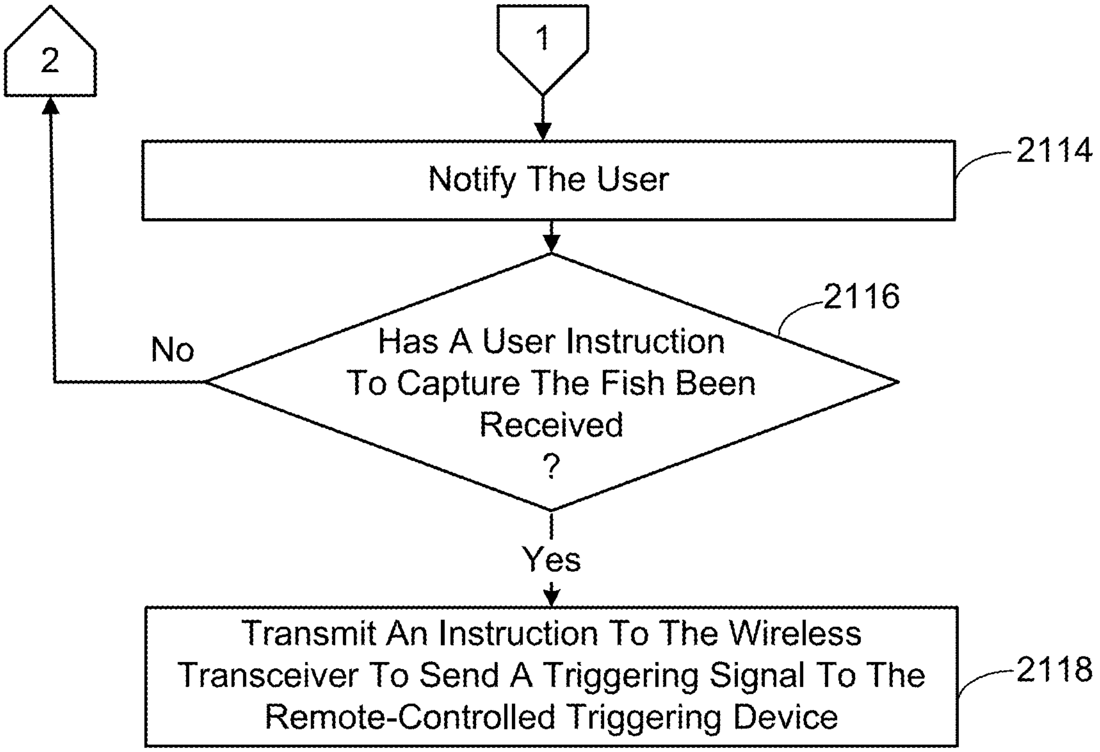

Further, the previously described fish recognition feature can be combined with the user feature. More particularly, referring to FIGS. 21A-B, in one implementation, the sub-programs of the fish capturing trap computer program for controlling the remote-controlled triggering device and at least one remote-controlled underwater camera, includes the following tasks. First, the controller transmits instructions to the wireless transceiver to send a camera signal to the cameras or cameras to capture images 2100 and to transfer the captured images to the controller 2102. Each captured image received is selected in the order it was received 2104 and is analyzed to detect if a fish has swum between the plates of the fish catching trap 2106. If it is detected that a fish has swum between the plates of the fish catching trap in the currently selected image 2108, the type of fish is identified 2110 and it is determined if the identified fish is of a type that has been predetermined to be a type of fish it is desired to catch 2112. If it is determined that the fish is of a type that has been predetermined to be a type of fish it is desired to catch, the user is informed via the user-interface device that a fish of the type it is desired to catch has swum between the plates of the fish catching trap 2114. Whenever a user instruction to capture the detected fish is received via the user-input device 2116, instructions are transmitted to the wireless transceiver to send a triggering signal to the remote-controlled triggering device to trigger the trigger mechanism 2118. This results in the fish catching trap being triggered, the plates closing, and the fish being trapped. Otherwise, if no fish is detected in the selected image, or the fish is not of the type it is desired to catch, or if a user instruction to capture the detected fish is not received, then actions 2104 through 2118 are repeated for each subsequently received image.

Figure 22:
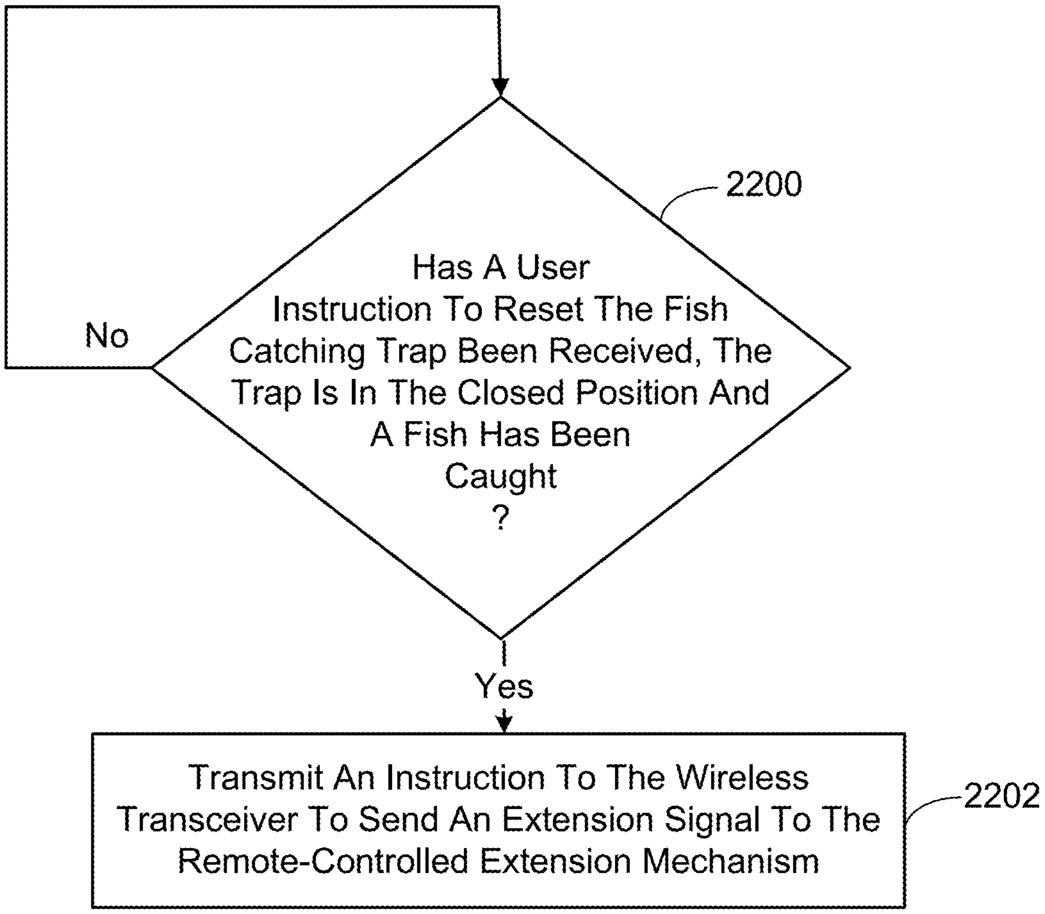
FIG. 22 is a diagram illustrating one implementation, in simplified form, of sub-programs of the fish catching trap control computer program for controlling the remote-controlled extension mechanism to reset the fish catching trap when the trap is in the closed position and a fish has been captured, based on a user instruction to do so.

It is noted that in any of the fish catching trap implementations employing remote control of the extension mechanism, a user could instruct the fish capturing trap that has caught a fish to "reset". This would cause the plates to separate and travel into their set position, thus releasing the captured fish. This feature is advantageous as it facilitates a humane catch and release scenario that does not harm the fish-unlike catching a fish using a hook. More particularly, referring to FIG. 22, in one implementation, the sub-program of the fish capturing trap computer program for controlling the remote-controlled extension mechanism includes the following tasks. Whenever a user instruction to reset the fish catching trap is received via the user-input device when the trap is in its closed position and a fish is caught between the plates 2200, instructions are transmitted to the wireless transceiver to send an extension signal to the extension mechanism to extend the telescoping rod from the closed position to the set position 2202.

1.4 Vertically Stacked Fish Catching Traps

In one implementation, particularly in an implementation employing remote control of the previously described ancillary equipment, multiple fish capturing traps could be stacked vertically. For example, a deeper lying trap could be connected to a shallower trap via a flexible line or lines (such as by a cable, rope, high strength fishing line, and so on) that attach at an upper end to the bottom of the centrally-located rod or transparent cylinder of the shallower trap and at the lower end to the top of the centrally-located rod or transparent cylinder of the deeper trap. In this way, each trap in the vertical stack would be at a different depth. This is advantageous as various types of fish tend to swim at different depths. Note that in the vertically stacked trap implementation, a weight would only be attached to the deepest trap and a floatation hoop would be made buoyant enough to remain afloat despite the weight of multiple traps, the weight, and the fish the traps are intended to trap.

In one implementation of the vertically stacked fish capturing traps, the previously described remote-controlled triggering device would be employed, as well as optionally others of the remote-controlled ancillary equipment. Since underwater RF communication signals have a limited range, these signals may to reach all the fish catching traps in a stacked implementation. The previously-described series of underwater RF communication relay transceivers can be employed to get the signal to the remote-controlled triggering device and other ancillary equipment.

1.5 Drones

In implementations employing remote control of ancillary equipment, it is possible to employ drones to deliver the fish catching trap to a desired fishing location and to retrieve the trap. In one version, this drone feature can be realized by affixing a drone attachment 1012 to a surface of the floatation device facing away from the water, as shown in FIG. 10 using broken lines to indicate the optional nature of the attachment. The drone attachment is configured to allow a drone or drones to attach to the attachment 1012 and lift the fish catching trap out of the water. In addition, a wireless, waterproof GPS transceiver 1014 (also shown in FIG. 10 using broken lines to indicate the optional nature of the transceiver) is added to the fish catching trap. For example, a wireless, waterproof GPS transceiver 1014 could be installed on the top of the floatation device 1002. This GPS transceiver 1014 would be configured to periodically transmit the trap's GPS coordinates or to transmit the coordinates in response to a received instruction to do so from the controller. These GPS coordinates include identity information which uniquely identifies the trap. Communication with the trap would be accomplished using radio communication if the fishing area is close enough to the user, or otherwise by satellite communications. It is noted that while the GPS transceiver 1014 is shown as a separate unit in FIG. 10 from the transceiver 1010, in one version these devices are integrated into a single unit (not shown).

The drone or drones employed to deliver and/or retrieve a fish capturing trap are of the type that can carry a trap to a fishing location and lower it into the water, track GPS-ID signals to locate a deployed trap, grab the trap and raise it up out of the water, and carry the retrieved trap to a prescribed location. It is noted that the aforementioned fish catching trap controller could be configured to communicate with the drone and assist it in deploying and retrieving a trap by, for example, providing a GPS location where the trap is to be deployed, and providing the approximate GPS location of a trap that is to be retrieved. Given the retrieval capability of the foregoing drone scheme, the user could initiate a drone retrieval operation that would bring a captured fish to the user's location.

1.6 Internet Site

In implementations employing remote control of ancillary equipment, the aforementioned fish catching trap controller could also be associated with an internet site where visitors can enjoy remote fishing using a fish catching trap. Images from the camera(s) could be live streamed to a site visitor and recorded for download to the visitor. The visitor could trigger a trap via the website, and release the captured fish as described previously.

1.7 Commercial Fishing Operation

The implementations employing remote control of ancillary equipment could also facilitate the fish catching trap's use in a commercial fishing operation. For example, multiple traps could be deployed to one or more fishing areas. The traps could also be stacked as described previously. In addition, a larger size trap may be advantageous for commercial fishing purposes. While a recreational user might, for example, employ a trap having a diameter of about 36 inches and a separation between the plates when in the set position of about 36 inches, a trap used for a commercial fishing operation might have a diameter and separation of twice that or more. A commercial fishing operation using fish catching traps as described previously could also be automated using drones. For example, the aforementioned controller can be configured to detect that a fish has swum between the plates and automatically trigger the trap to close and capture the fish as described previously. Also as indicated previously, this might also involve identifying the type of fish that has swum between the plates and only triggering the trap if it is a type of fish it is desired to capture. The aforementioned GPS-ID transceiver can be configured to also provide a notification that a fish has been caught. In response, the controller would be configured to dispatch a drone to retrieve the trap. This type of operation can run 24-7 if desired.

2.0 Additional Implementations

While the fish catching trap has been described by specific reference to implementations thereof, it is understood that variations and modifications thereof can be made without departing from the true spirit and scope of the trap. For example, the fish catching trap implementations employing a centrally-located telescoping rod or the centrally-located transparent cylinder can also include one or more spearguns. The addition of a speargun to the fish catching trap allows a user to catch a fish that is swimming outside plates of the trap. As such, the user enjoys a more active involvement in the fishing process and does not have to wait for a fish to enter the fish catching trap.

Figure 23:
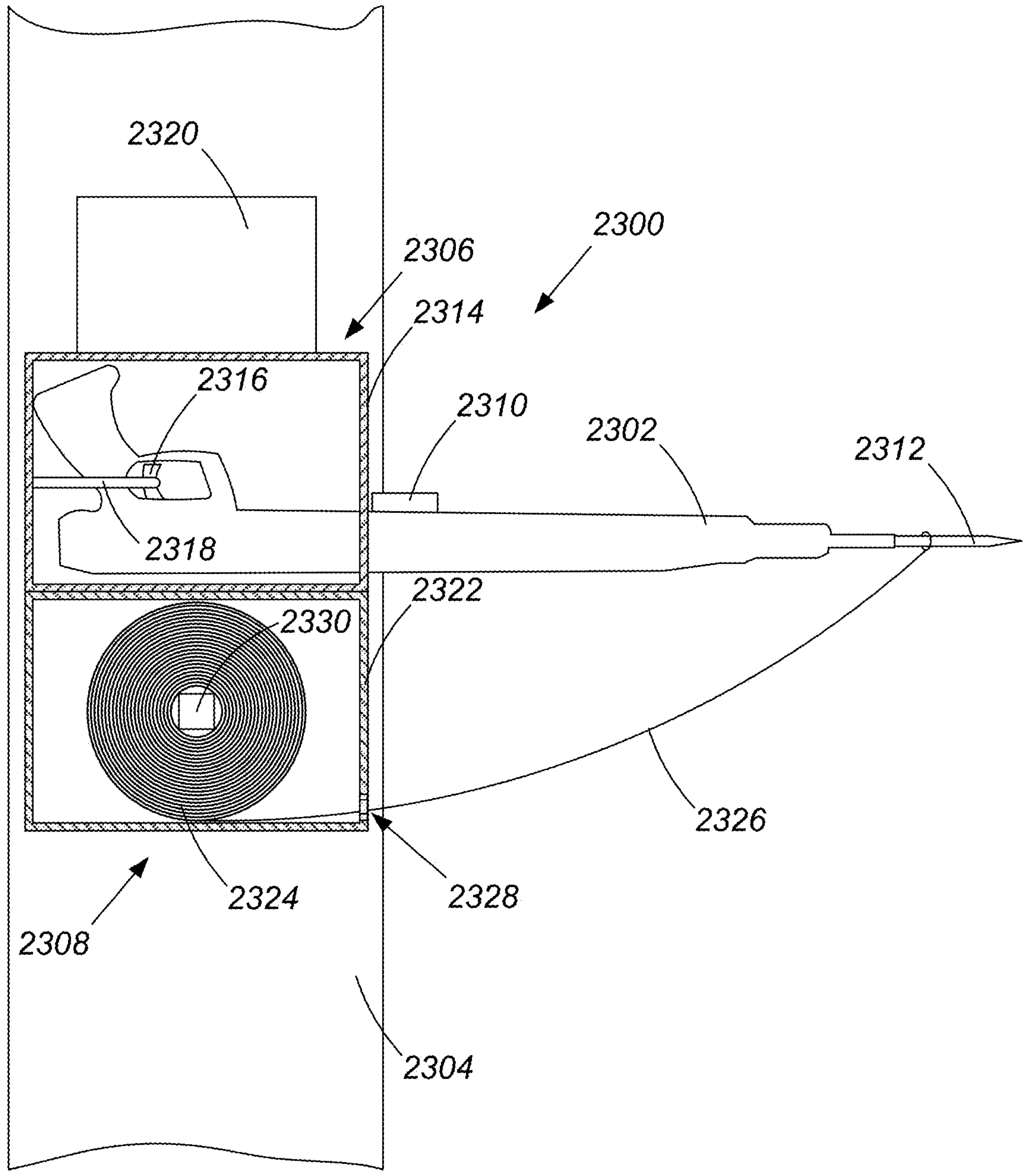
FIG. 23 is a diagram illustrating a side view, in simplified form, of one implementation of the fish catching trap having a speargun system attached to the middle section of the centrally-located telescoping rod.

More particularly, referring to FIG. 23, a speargun system 2300 is shown. It is noted that in the depicted implementation, the fish catching trap employing a centrally-located telescoping rod and one speargun system 2300 is shown as an example. Additional speargun systems can be included which face different directions if desired. The speargun system is attached to the outside of the middle section 2304 of the rod either above or below any other ancillary equipment (e.g., a remote-controlled extension mechanism which is not shown).

In one implementation, the speargun system 2300 includes a pneumatic speargun 2302 which is pointed radially outward from the middle section 2304 of the rod, as well as a remote-control triggering mechanism 2306, remote-controlled reel 2308, and a laser targeting device 2310. The remote-controlled triggering mechanism 2306 triggers the pneumatic speargun 2302 which is pre-charged and loaded with a fishing spear 2312, and so is ready to fire the fishing spear when triggered by the remote-controlled triggering mechanism. It is noted that in one implementation, the fishing spear is made of a transparent material to make it invisible to the fish. In one version, the remote-controlled triggering mechanism 2306 employs a hollow housing 2314 that is attached to the mechanical trigger 2316 of the pneumatic speargun 2302. Inside the hollow housing 2314 is an electrically-operated linear actuator 2318 that is connected to the speargun trigger 2316 and configured to pull the trigger when activated. The linear actuator 2318 is electrically connected to an underwater RF transceiver 2320. When the underwater RF transceiver 2320 receives a speargun triggering signal from the previously described wireless transceiver (see wireless transceiver 1010 in FIG. 10), it sends an initiating signal to the linear actuator 2318, which in turn pulls the speargun trigger 2316. The wireless transceiver sends the speargun triggering in response to speargun triggering instructions wirelessly received from the fish catching trap controller. In one version, the speargun triggering instructions are transmitted by the controller via, for example, a relatively localized radio signal or a satellite communication link.

The laser targeting device 2310 is configured to shine a laser beam through the water from the speargun system along a line approximately coincident with the trajectory that the fishing spear 2312 will take when the pneumatic speargun 2302 is fired. In operation, when a user sees (via the previously described camera or cameras) a laser dot on a fish that the user wishes to spear, the user employs the fish catching trap controller to transmit the speargun triggering instructions.

The remote-controlled reel 2308 includes a hollow housing 2322 in which a rotatable reel 2324 resides. The reel 2324 is wound with heavy duty fishing line 2326. A length of the line 2326 extends from the reel 2324, out of a hole 2328 in the housing, and its end is attached to a portion of the fishing spear 2312 that extends out of the front end of the pneumatic speargun 2302. The reel 2324 is normally in a free spinning mode such that when the fishing spear 2312 is fired, the reel plays out line 2326 which the fishing spear drags along with it. In operation, when the fishing spear 2312 finds its target, the user sees this (via the previously described camera or cameras) and employs the fish catching trap controller to transmit a remote-controlled reel retraction instruction. The aforementioned wireless transceiver (see wireless transceiver 1010 reel in FIG. 10) receives the remote-controlled reel retraction instruction and transmits a reel retraction signal to the underwater RF transceiver 2320. The underwater RF transceiver 2320, which is electrically connected to a preconfigured step motor 2330 attached to the reel 2324 of the remote-controlled reel 2308, in turn sends an activation signal to the motor which causes the reel to rotate in a direction that retracts the line 2326 that has been played out, until the speared fish has been pulled between the fish catching trap plates. The fish catching trap can then be triggered to close the plates with the speared fish inside.

As with the remote-controlled triggering device, since underwater RF communication signals have a limited range, the previously-described series of underwater RF communication relay transceivers can be employed to get the speargun triggering signal to the remote-control triggering mechanism 2306, and to get the reel retraction signal to the remote-controlled reel 2308.

It is also noted that any or all of the aforementioned implementations throughout the description may be used in any combination desired to form additional hybrid implementations. In addition, although the fish catching trap implementations have been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims. In regard to the various functions performed by the above described components and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

3.0 Exemplary Operating Environments

Figure 24:
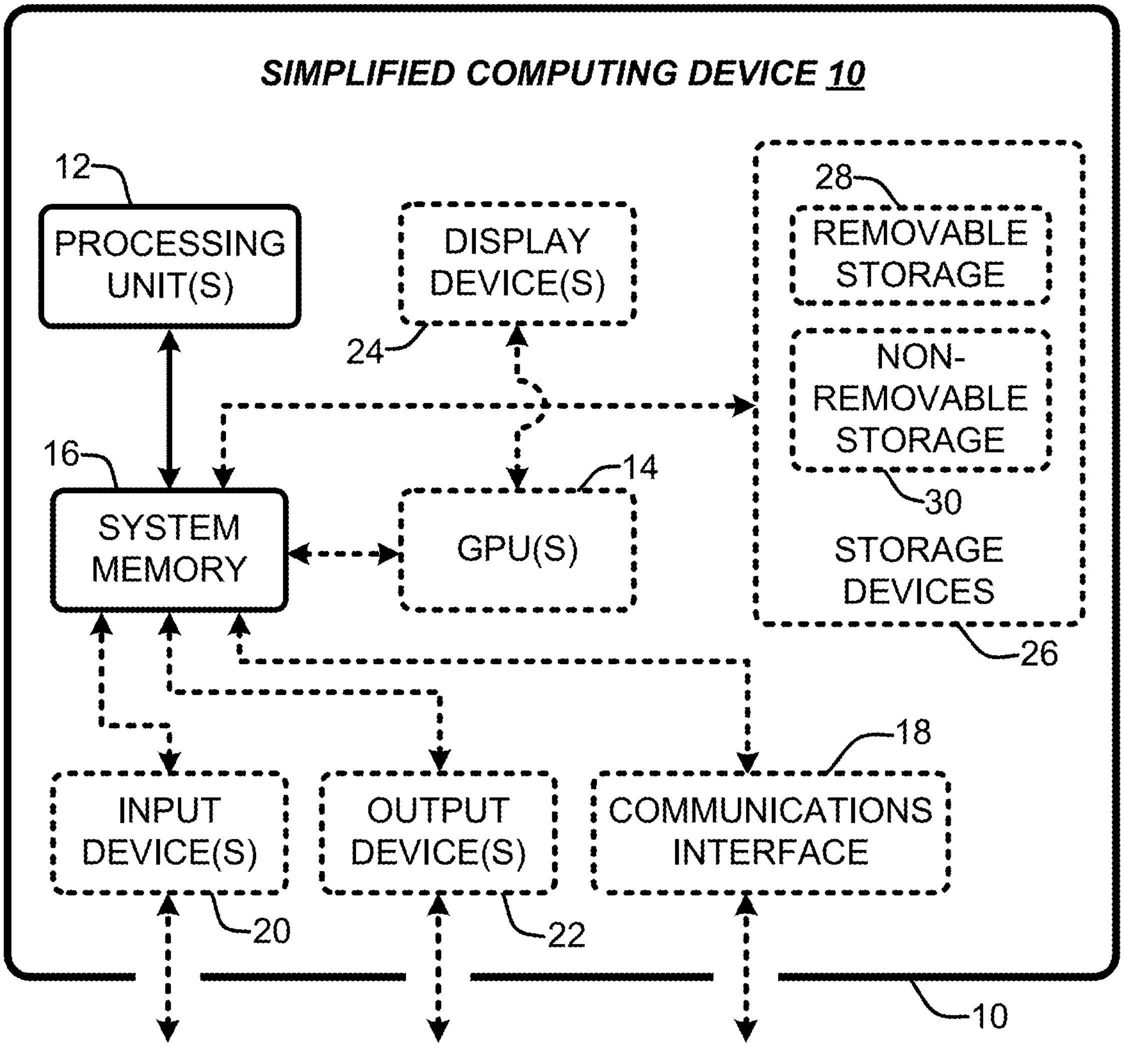
FIG. 24 is a diagram illustrating a simplified example of a computing device on which various aspects of the fish catching trap controller, as described herein, may be realized.

The previously described computing device(s) and memory components of the fish catching trap implementations can employ numerous types of general purpose or special purpose computing system environments or configurations. FIG. 24 illustrates a simplified example of a general-purpose computer system on which various implementations and elements of the fish catching trap, as described herein, may be implemented. It is noted that any boxes that are represented by broken or dashed lines in the simplified computing device 10 shown in FIG. 24 represent alternate implementations of the simplified computing device. As described below, any or all of these alternate implementations may be used in combination with other alternate implementations that are described throughout this document. The simplified computing device 10 is typically found in devices having at least some minimum computational capability such as microprocessor-based systems, programmable consumer electronics, and minicomputers.

The computing device should have sufficient computational capability and system memory to enable basic computational operations. In particular, the computational capability of the simplified computing device 10 shown in FIG. 24 is generally illustrated by one or more processing unit(s) 12, and may also in some implementations include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature described herein, including input, output, control, feedback, and response to one or more users or other devices or systems associated with the fish catching trap implementations, are enabled by a variety of Natural User Interface (NUI) scenarios. The NUI techniques and scenarios enabled by the fish catching trap implementations include, but are not limited to, interface technologies that allow one or more users to interact with the fish catching trap implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects, or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the fish catching trap implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the fish catching trap implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 24 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various fish catching trap implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Some aspects of the fish catching trap implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. Some aspects of the fish catching trap implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor. Still further, aspects of the fish catching trap implementations described herein can be virtualized and realized as a virtual machine running on a computing device such as any of those described previously.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A fish catching trap, comprising:

a first plate having a shape comprising an outward facing surface and an inward facing surface and an outer rim;

a second plate having substantially the same shape as the first plate with an outward facing surface and an inward facing surface and an outer rim, wherein the inward facing surface of the second plate faces the inward facing surface of the first plate and wherein a plane defined by the outer rim of the second plate is oriented substantially parallel to a plane defined by the outer rim of the first plate;

a telescoping rod that is extendable to a set position and retractable to a closed position and which contracts longitudinally from the set position to the closed position unless locked into the set position, wherein the first plate is attached to a first end of the telescoping rod at a centrally located area of the first plate and the second plate is attached to a second end of the telescoping rod at a centrally located area of the second plate; and a trigger mechanism which when engaged locks the telescoping rod in the set position wherein the first and second plates are spaced apart by a prescribed distance, and which when triggered while the fish catching trap is suspended at any depth in a body of water releases the trigger mechanism causing the telescoping rod to contract to the closed position wherein the first and second plates are drawn together to a degree of closure and at a speed that traps a fish that has swum between the plates before it can swim out;

wherein the telescoping rod is a spring-loaded telescoping rod comprising:

a series of hollow sections with a middle section that has a length approximately corresponding to the closed position of the telescoping rod and one or more distal sections on each end of the middle section which each have a diameter that is smaller than a more proximal adjacent section associated therewith and which are sized to form a sliding fit with the associated more proximal adjacent section, such that each distal section slides into its associated more proximal adjacent section of the telescoping rod whenever the telescoping rod moves from the set position to the closed position and each distal section slides partially out of its associated more proximal adjacent section of the telescoping rod whenever the telescoping rod moves from the closed position to the set position, and a tension coil spring which is attached at one end to an internal distal end of the distal-most distal section of the one or more distal sections on one end of the middle section and attached at the other end to an internal distal end of the other distal-most distal section of the one or more distal sections on the other end of the middle section, wherein the tension coil spring is in an initial tension condition whenever the telescoping rod is in the closed position and in a greater final tension condition whenever the telescoping rod is in the set position, and wherein the tension coil spring is chosen to provide enough tension in the set position that when the trigger mechanism is triggered, the tension coil spring will retract at a speed which pulls the plates into the closed position fast enough to prevent a fish that has swum between the plates from escaping.

2. The fish catching trap of claim 1, wherein the first and second plates each comprise an annular hoop which forms the outer rim of each plate, one or more spokes that connect an inward facing wall of the hoop to the telescoping rod, and a mesh material that covers the outward facing surface and which has a mesh size that allows water to flow through the material whenever the plates are drawn together or pulled apart but does not let a fish caught between the plates in the closed position to escape.

3. The fish catching trap of claim 2, wherein the annular hoop and one or more spokes of each plate have a hydrodynamic cross-sectional profile that reduces drag when the plates are moving through water.

4. The fish catching trap of claim 2, wherein the first plate comprises a dome shape wherein a height of the dome at a centrally located area of the first plate where the telescoping rod is attached is approximately one-half a longitudinal length of the telescoping rod when in its closed position above an inward facing edge of the outer rim of the first plate, and the second plate comprises a dome shape wherein a height of the dome at a centrally located area of the second plate where the telescoping rod is attached is approximately one-half the longitudinal length of the telescoping rod when in its closed position above an inward facing edge of the outer rim of the second plate, so as to ensure the inward facing edge of the outer rim of the first plate touches the inward facing edge of the outer rim of the second plate whenever the telescoping rod is in its closed position.

5. The fish catching trap of claim 2, wherein each plate is made from a transparent material so that the plates are substantially invisible underwater.

6. The fish catching trap of claim 2, further comprising a series of magnets located around inward facing edges of the outer rims of the first and second plates, wherein the magnets being approximately equally spaced around the outer rims and a location of each magnet on the outer rim of the first plate corresponds with the location of a corresponding magnet on the outer rim of the second plate whenever the telescoping rod is in its closed position, and wherein sides of the magnets on the first plate that face the second plate exhibit a first polarity and sides of the magnets on the second plate that face the first plate exhibit a polarity opposite the first polarity.

7. The fish catching trap of claim 1, further comprising a deployment fixture attached to the first end of the telescoping rod, wherein the deployment fixture is configured to facilitate a releasable deployment line used to lower the fish catching trap into the water or raise the fish catching trap from the water.

8. The fish catching trap of claim 1, further comprising a fish lure which is attached to the inward facing surface of the first plate and which dangles from the first plate when the fish catching trap is in the set position.

9. The fish catching trap of claim 1, further comprising:

a floatation device which is attached to the first end of the telescoping rod by at least three equal length attachment lines each of which is attached to the floatation device at different equally spaced locations; and a weight which is attached to the other end of the telescoping rod; and wherein whenever the fish catching trap is deployed in the water, the floatation device floats on the surface of the water and the weight pulls the telescoping rod and plates of the fish catching trap down under the surface of the water until the attachment lines are taut, such that the length of the attachment lines dictates how deep the telescoping rod and plates are under the surface of the water.

10. The fish catching trap of claim 9, wherein the floatation device further comprises drone attachments that are affixed to a surface of the floatation device facing away from the water, said drone attachments being configured to allow a drone or drones to attach to the attachments and lift the fish catching trap into the air.

11. The fish catching trap of claim 10, further comprising a waterproof GPS wireless transceiver attached to the surface of the floatation device facing away from the water, which periodically transmits the GPS coordinates of the fish catching trap and identity information that uniquely identifies the fish catching trap, either automatically or in response to a received instruction to do so.

12. The fish catching trap of claim 1, further comprising at least one of:

a remote-controlled triggering device, and a wireless transceiver which is in electrical communication with the remote-controlled triggering device, wherein the remote-controlled triggering device triggers the trigger mechanism in response to a triggering signal sent by the wireless transceiver to the remote-controlled triggering device, said wireless transceiver sending the triggering signal in response to a triggering instruction wirelessly received from a fish catching trap controller;

a remote-controlled extension mechanism which is in electrical communication with the wireless transceiver, wherein the remote-controlled extension mechanism extends the telescoping rod from the closed position to the set position in response to an extension signal sent by the wireless transceiver to the remote-controlled extension mechanism, said wireless transceiver sending the extension signal in response to an extension instruction wirelessly received from the controller;

at least one remote-controlled light attached to a bottom of the telescoping rod and which is in electrical communication with the wireless transceiver, wherein each of the at least one remote-controlled light or lights are turned on or off in response to an on-off signal sent by the wireless transceiver to each of the at least one remote-controlled light or lights, said wireless transceiver sending the on-off signal in response to an on-off instruction wirelessly received from the controller;

at least one remote-controlled underwater camera attached to the telescoping rod between the first and second plates and which is in electrical communication with the wireless transceiver, wherein each of the remote-controlled underwater camera or cameras are turned on or off, instructed to capture images or videos, and instructed to transmit the captured images or videos to the controller in response to camera signals sent by the wireless transceiver to each of the remote-controlled underwater camera or cameras, said wireless transceiver sending the camera signals in response to camera instructions wirelessly received from the controller; and at least one remote-controlled speargun system attached to the telescoping rod between the plates and which is in electrical communication with the wireless transceiver, wherein each speargun system is triggered to shoot a fishing spear in response to a triggering signal sent by the wireless transceiver to a remote-controlled triggering device of the speargun system, and wherein each speargun system reels in a line that is attached to the fishing spear and played out by a remote-controlled reel whenever the fishing spear is shot in response to a reel retraction signal sent by the wireless transceiver to a motor of the remote-controlled reel, said wireless transceiver sending the signals in response to instructions wirelessly received from the controller.

13. The fish catching trap of claim 12, wherein the fish catching trap controller comprises one or more computing devices, and a fish catching trap control computer program having a plurality of sub-programs executable by said computing device or devices, wherein the sub-programs configure said one or more computing devices to control, via instructions transmitted to the wireless transceiver, at least one of the remote-controlled triggering device, remote-controlled extension mechanism, at least one remote-controlled light, and at least one remote-controlled underwater camera.

14. The fish catching trap of claim 13, wherein the fish catching trap comprises both the remote-controlled triggering device and the at least one remote-controlled underwater camera, and wherein the sub-programs for controlling the remote-controlled triggering device, and the at least one remote-controlled underwater camera, comprise sub-programs for automating the fish catching trap, said automation sub-programs comprising:

an image capture sub-program which transmits instructions to the wireless transceiver to send a camera signal to the cameras or cameras to capture images;

a captured image receipt sub-program which receives captured images from the wireless transceiver;

a captured image analysis sub-program which analyzes each captured image in the order it was received to detect if a fish has swum between the plates of the fish catching trap; and a triggering sub-program which whenever it is detected that a fish has swum between the plates of the fish capturing trap, transmits instructions to the wireless transceiver to send a triggering signal to the remote-controlled triggering device to trigger the trigger mechanism.

15. The fish catching trap of claim 13, wherein the fish catching trap comprises both the remote-controlled triggering device and the at least one remote-controlled underwater camera, and wherein the sub-programs for controlling the remote-controlled triggering device, and the at least one remote-controlled underwater camera, comprise sub-programs for automating the fish catching trap, said automation sub-programs comprising:

an image capture sub-program which transmits instructions to the wireless transceiver to send a camera signal to the cameras or cameras to capture images;

a captured image receipt sub-program which receives captured images from the wireless transceiver;

a captured image analysis sub-program which analyzes each captured image in the order it was received to detect if a fish has swum between the plates of the fish catching trap;

a fish identification sub-program which whenever it is detected that a fish has swum between the plates of the fish capturing trap, identifies the type of fish and determines if the identified fish is of a type that has been predetermined to be a type of fish it is desired to catch; and a triggering sub-program which whenever it is detected that a fish has swum between the plates of the fish capturing trap and has been determined to be of a type that has been predetermined to be a type of fish it is desired to catch, transmits instructions to the wireless transceiver to send a triggering signal to the remote-controlled triggering device to trigger the trigger mechanism.

16. The fish catching trap of claim 13, wherein the fish catching trap comprises both the remote-controlled triggering device and the at least one remote-controlled underwater camera, and wherein the sub-programs for controlling the remote-controlled triggering device, and the at least one remote-controlled underwater camera, comprise sub-programs for automating the fish catching trap, said automation sub-programs comprising:

an image capture sub-program which transmits instructions to the wireless transceiver to send a camera signal to the cameras or cameras to capture images;

a captured image receipt sub-program which receives captured images from the wireless transceiver;

a captured image analysis sub-program which analyzes each captured image in the order it was received to detect if a fish has swum between the plates of the fish catching trap;

a user notification sub-program which informs a user via a user-interface associated with the fish catching trap controller that a fish has swum between the plates of the fish catching trap;

a user instruction receipt sub-program which receives a user instruction to capture the fish via a user-input device associated with the fish catching trap controller; and a triggering sub-program which whenever the user instruction to capture the fish is received, transmits instructions to the wireless transceiver to send a triggering signal to the remote-controlled triggering device to trigger the trigger mechanism.

17. The fish catching trap of claim 13, wherein the fish catching trap comprises both the remote-controlled triggering device and the at least one remote-controlled underwater camera, and wherein the sub-programs for controlling the remote-controlled triggering device, and the at least one remote-controlled underwater camera, comprise sub-programs for automating the fish catching trap, said automation sub-programs comprising:

an image capture sub-program which transmits instructions to the wireless transceiver to send a camera signal to the cameras or cameras to capture images;

a captured image receipt sub-program which receives captured images from the wireless transceiver;

a captured image analysis sub-program which analyzes each captured image in the order it was received to detect if a fish has swum between the plates of the fish catching trap;

a fish identification sub-program which whenever it is detected that a fish has swum between the plates of the fish capturing trap, identifies the type of fish and determines if the identified fish is of a type that has been predetermined to be a type of fish it is desired to catch;

a user notification sub-program which informs a user via a user-interface associated with the fish catching trap controller that a fish of the type it is desired to catch has swum between the plates of the fish catching trap;

a user instruction receipt sub-program which receives a user instruction to capture the fish via a user-input device associated with the fish catching trap controller; and a triggering sub-program which whenever the user instruction to capture the fish is received, transmits instructions to the wireless transceiver to send a triggering signal to the remote-controlled triggering device to trigger the trigger mechanism.

18. The fish catching trap of claim 13, wherein the fish catching trap comprises the remote-controlled extension mechanism, and wherein the sub-programs for controlling the remote-controlled extension mechanism comprises automating the fish catching trap, said automation comprising transmitting instructions to the wireless transceiver to send an extension signal to the remote-controlled extension mechanism to extend the telescoping rod from the closed position to the set position.

* * * * *